(12) United States Patent
Özden et al.

(10) Patent No.: US 12,320,184 B2
(45) Date of Patent: Jun. 3, 2025

(54) FRAME SOLUTION FOR LAMINATED VIG UNIT

(71) Applicant: VKR HOLDING A/S, Hørsholm (DK)

(72) Inventors: Utku Ahmet Özden, Hørsholm (DK); Jacob Christian Molbo, Hørsholm (DK); Jens Troels Plesner Kristensen, Hørsholm (DK)

(73) Assignee: VKR HOLDING A/S, Horsholm (DK)

( * ) Notice: Subject to any disclaimer, the term of this patent is extended or adjusted under 35 U.S.C. 154(b) by 830 days.

(21) Appl. No.: 17/422,780

(22) PCT Filed: Jan. 13, 2020

(86) PCT No.: PCT/DK2020/050012
§ 371 (c)(1),
(2) Date: Jul. 14, 2021

(87) PCT Pub. No.: WO2020/147903
PCT Pub. Date: Jul. 23, 2020

(65) Prior Publication Data
US 2022/0081959 A1   Mar. 17, 2022

(30) Foreign Application Priority Data

Jan. 14, 2019 (DK) .............................. PA201970020
Jan. 14, 2019 (DK) .............................. PA201970021
(Continued)

(51) Int. Cl.
*E06B 3/54* (2006.01)
*E04D 13/03* (2006.01)
(Continued)

(52) U.S. Cl.
CPC ............ *E06B 3/6612* (2013.01); *E04D 13/03* (2013.01); *E04D 13/031* (2013.01);
(Continued)

(58) Field of Classification Search
CPC ........ E06B 3/54; E06B 3/5409; E06B 3/5454; E06B 3/5481; E06B 3/62; E06B 3/6608; E06B 3/6612; E06B 3/677
See application file for complete search history.

(56) References Cited

U.S. PATENT DOCUMENTS 2,595,927 A    5/1952  Chapin
2,617,159 A *  11/1952 Leighton ............... E06B 3/5409
                                                    52/204.593
(Continued)

FOREIGN PATENT DOCUMENTS

CN          2835403 Y    11/2006
CN       106760122 A     5/2017
(Continued)

OTHER PUBLICATIONS

Document and Machine translation of EP 3170799A1 to Ikeda; May 2017 (Year: 2017).*
(Continued)

*Primary Examiner* — Ryan D Kwiecinski
(74) *Attorney, Agent, or Firm* — CANTOR COLBURN LLP

(57) ABSTRACT

The present disclosure relates to a vacuum insulated glass (VIG) unit frame assembly (10), wherein said vacuum insulated glass unit frame assembly (1) comprises: a frame (20) comprising elongated frame profile arrangements (20a-20d, 70) which frames a vacuum insulated glass unit (1) in a frame opening (21), wherein said vacuum insulated glass unit (1) comprises at least two glass sheets (2a, 2b) separated by a gap (11) between said glass sheets (2a, 2b), wherein a plurality of support structures (12) are distributed in said gap (11), and wherein said gap (11) is sealed by means of a sealing system (1b, 1c) which seals an evacuation hole (1a) arranged in a first (2a) of said glass sheets and extending to the gap (11). A lamination glass sheet (14) is attached to an
(Continued)

Figure 1:
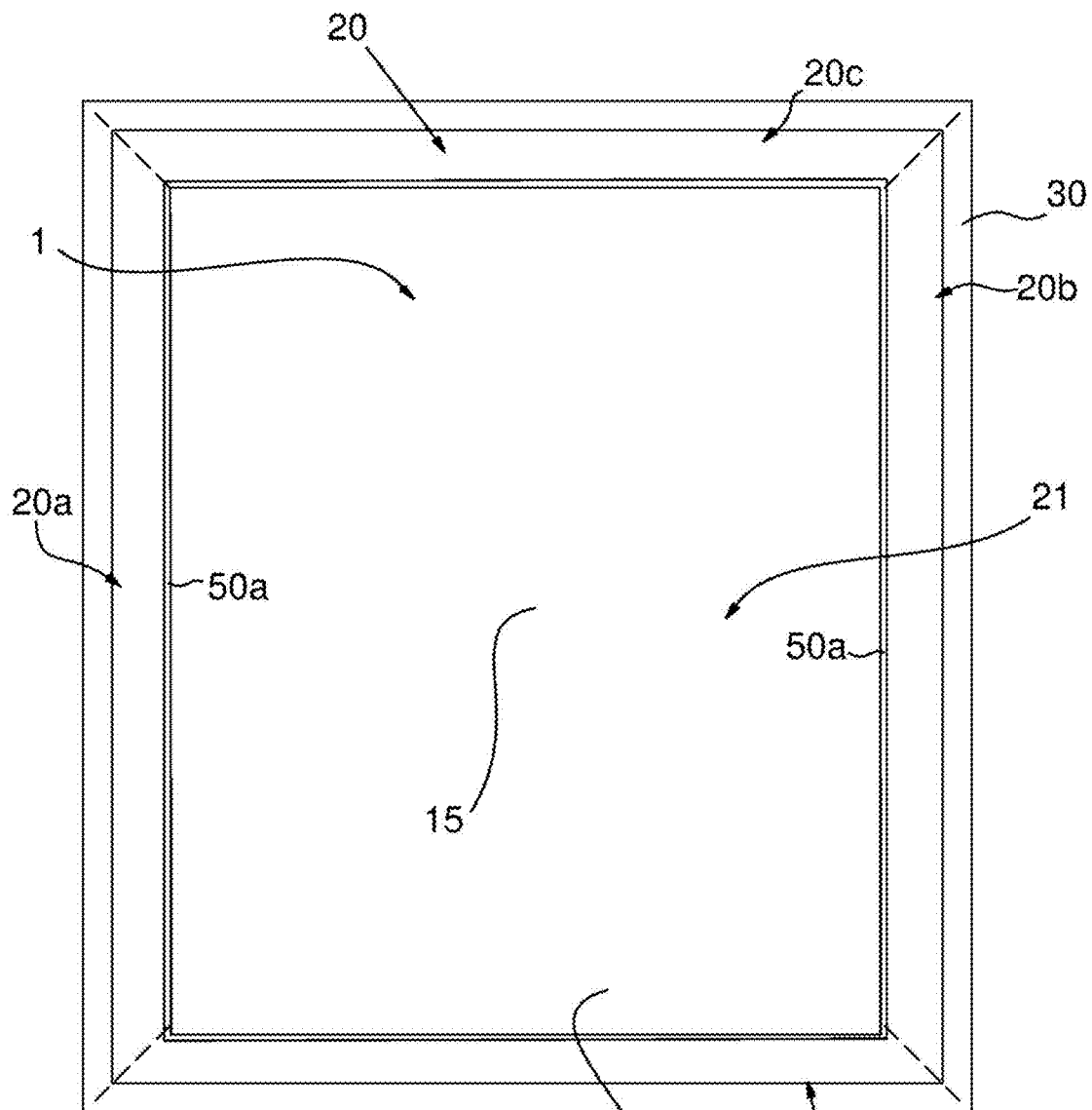

outer major surface (4a) of said first glass sheet (2a) by means of a lamination layer (16), and wherein said sealing system (1c) extends into a hole (14a) in the lamination glass sheet (14), and the edge (8a-8c) of the vacuum insulated glass unit (1) proximate the hole (14a) in the lamination glass sheet (14), said sealing system (1c) and said hole in the lamination glass sheet (14) into which the sealing system (1c) extends are covered by the frame (20). The disclosure additionally relates to a retrofitting frame system (100) and a laminated vacuum insulated glass unit (1).

20 Claims, 14 Drawing Sheets

(30) Foreign Application Priority Data

| Jan. 14, 2019 | (DK) | PA201970022 |
|---|---|---|
| Jan. 14, 2019 | (DK) | PA201970023 |
| Jan. 14, 2019 | (DK) | PA201970024 |
| Jan. 14, 2019 | (DK) | PA201970025 |
| Jan. 14, 2019 | (DK) | PA201970026 |

(51) Int. Cl.
*E04D 13/035* (2006.01)
*E06B 3/02* (2006.01)
*E06B 3/14* (2006.01)
*E06B 3/56* (2006.01)
*E06B 3/62* (2006.01)
*E06B 3/66* (2006.01)
*E06B 3/67* (2006.01)
*E06B 3/677* (2006.01)
*E06B 7/23* (2006.01)

(52) U.S. Cl.
CPC ....... *E04D 13/0315* (2013.01); *E04D 13/035* (2013.01); *E04D 13/0351* (2013.01); *E04D 13/0354* (2013.01); *E06B 3/025* (2013.01); *E06B 3/14* (2013.01); *E06B 3/5427* (2013.01); *E06B 3/5454* (2013.01); *E06B 3/5481* (2013.01); *E06B 3/56* (2013.01); *E06B 3/62* (2013.01); *E06B 3/6621* (2013.01); *E06B 3/677* (2013.01); *E06B 7/2301* (2013.01); *E06B 7/2305* (2013.01); *E06B 2003/6208* (2013.01); *E06B 2003/6229* (2013.01); *E06B 2003/6238* (2013.01); *E06B 2003/6291* (2013.01); *Y02A 30/249* (2018.01); *Y02B 80/22* (2013.01)

(56) References Cited

U.S. PATENT DOCUMENTS

| 2,781,561 | A |  | 2/1957 | Gifford | |
|---|---|---|---|---|---|
| 3,686,795 | A |  | 8/1972 | La Barge | |
| 3,861,085 | A |  | 1/1975 | Jacob | |
| 4,134,234 | A |  | 1/1979 | Auger | |
| 4,134,238 | A | * | 1/1979 | Auger | E06B 3/5409 |
|  |  |  |  |  | 52/656.5 |
| 4,193,236 | A | * | 3/1980 | Mazzoni | E06B 3/66342 |
|  |  |  |  |  | 52/204.593 |
| 5,216,855 | A | * | 6/1993 | Richter | E06B 3/5821 |
|  |  |  |  |  | 52/204.593 |
| 5,373,672 | A |  | 12/1994 | Schulz | |
| 5,657,607 | A | * | 8/1997 | Collins | E06B 3/66304 |
|  |  |  |  |  | 52/786.13 |
| 5,891,536 | A | * | 4/1999 | Collins | E06B 3/66304 |
|  |  |  |  |  | 52/786.13 |
| 6,263,623 | B1 |  | 7/2001 | Weiss | |
| 6,295,774 | B1 | * | 10/2001 | Lindgren | E04D 13/031 |
|  |  |  |  |  | 52/204.1 |
| 6,435,360 | B1 |  | 8/2002 | Anin | |
| 6,676,786 | B1 | * | 1/2004 | Collins | E06B 3/6775 |
|  |  |  |  |  | 156/286 |
| 7,588,653 | B2 | * | 9/2009 | Crandell | E06B 3/24 |
|  |  |  |  |  | 52/204.5 |
| 7,845,142 | B2 | * | 12/2010 | Theios | E06B 1/26 |
|  |  |  |  |  | 52/204.6 |
| 7,950,192 | B2 | * | 5/2011 | Glover | B29C 66/72523 |
|  |  |  |  |  | 52/204.593 |
| 8,181,405 | B2 | * | 5/2012 | Nash | E04F 11/1851 |
|  |  |  |  |  | 52/800.18 |
| 9,447,627 | B2 | * | 9/2016 | Thompson | E06B 3/5454 |
| 10,415,302 | B2 | * | 9/2019 | Vander Bent, Jr. | E06B 3/5409 |
| 10,597,933 | B2 | * | 3/2020 | Abe | E06B 3/6612 |
| 10,704,320 | B2 | * | 7/2020 | Sønderkær | C03C 27/06 |
| 10,919,236 | B2 | * | 2/2021 | Vaccari | E06B 3/5454 |
| 11,060,341 | B1 | * | 7/2021 | Sprague | E06B 3/549 |
| 11,187,027 | B2 | * | 11/2021 | Hasegawa | E06B 3/663 |
| 11,285,703 | B2 | * | 3/2022 | Jørgensen | B32B 41/00 |
| 11,802,435 | B2 | * | 10/2023 | Özden | E06B 3/14 |
| 11,834,895 | B2 | * | 12/2023 | Özden | E06B 3/5454 |
| 2003/0037493 | A1 | * | 2/2003 | Guhl | E06B 3/24 |
|  |  |  |  |  | 52/786.13 |
| 2005/0126093 | A1 | * | 6/2005 | Wagner | E04D 13/0305 |
|  |  |  |  |  | 52/200 |
| 2007/0032972 | A1 | * | 2/2007 | Glover | B29C 65/7841 |
|  |  |  |  |  | 702/77 |
| 2009/0324858 | A1 | * | 12/2009 | Jaeger | E06B 3/6612 |
|  |  |  |  |  | 156/107 |
| 2012/0137607 | A1 |  | 6/2012 | Kristensen | |
| 2013/0101759 | A1 | * | 4/2013 | Jones | E06B 3/6612 |
|  |  |  |  |  | 428/34 |
| 2014/0007396 | A1 |  | 1/2014 | Jones | |
| 2014/0069034 | A1 | * | 3/2014 | Jones | E06B 3/585 |
|  |  |  |  |  | 52/204.593 |
| 2015/0345207 | A1 | * | 12/2015 | Thompson | E06B 3/677 |
|  |  |  |  |  | 52/204.6 |
| 2017/0002599 | A1 | * | 1/2017 | Thompson | E06B 3/5454 |
| 2017/0268285 | A1 | * | 9/2017 | Abe | C03C 27/10 |
| 2022/0065026 | A1 | * | 3/2022 | Özden | E04D 13/03 |

FOREIGN PATENT DOCUMENTS

| DE | 3202639 | A1 |  | 8/1983 | |
|---|---|---|---|---|---|
| DE | 102006020455 | A1 |  | 6/2007 | |
| DE | 202009016113 | U1 |  | 5/2011 | |
| DE | 202012006687 | U1 | * | 12/2013 | E05C 1/04 |
| DE | 10201400186 | A1 |  | 2/2016 | |
| EP | 0418461 | A1 |  | 3/1991 | |
| EP | 0421239 | A2 |  | 4/1991 | |
| EP | 0472109 | A2 |  | 2/1992 | |
| EP | 1298100 | A1 |  | 4/2003 | |
| EP | 1908914 | A1 |  | 4/2008 | |
| EP | 2169172 | A2 | * | 3/2010 | E04D 13/0354 |
| EP | 2921632 | A1 |  | 9/2015 | |
| EP | 3101195 | A1 |  | 12/2016 | |
| EP | 3124733 | A1 |  | 2/2017 | |
| EP | 3170799 | A1 | * | 5/2017 | C03C 27/10 |
| ES | 2169172 | T3 | * | 7/2002 | A47L 15/4229 |
| FR | 2514057 | A1 |  | 4/1983 | |
| FR | 2823789 | A1 |  | 10/2002 | |
| FR | 2942843 | A1 |  | 9/2010 | |
| FR | 3075245 | A1 | * | 6/2019 | E06B 3/5454 |
| GB | 2264742 | A | * | 9/1993 | E06B 3/5481 |
| GB | 2492380 | A |  | 1/2013 | |
| GB | 2521419 | A |  | 6/2015 | |
| JP | 2000064732 | A | * | 2/2000 | E06B 3/6205 |
| JP | 2001031449 | A | * | 2/2001 | E06B 3/6775 |
| JP | 2001146881 | A |  | 5/2001 | |
| JP | 2002021437 | A |  | 1/2002 | |
| JP | 2002255593 | A | * | 9/2002 | |
| JP | 2007132637 | A |  | 5/2007 | |
| KR | 20180128659 | A |  | 12/2018 | |
| WO | WO-9914169 | A1 | * | 3/1999 | C03C 27/06 |
| WO | WO-2011048559 | A1 | * | 4/2011 | E04B 2/7401 |
| WO | 2014039642 | A1 |  | 3/2014 | |

(56) References Cited

FOREIGN PATENT DOCUMENTS

| WO | WO-2014183606 A1 | * | 11/2014 | ........... E06B 3/6621 |
|----|------------------|---|---------|-------------------------|
| WO | 2015183863 A1    |   | 12/2015 |                         |
| WO | 2017210701 A1    |   | 12/2017 |                         |
| WO | WO-2020147903 A1 | * | 7/2020  | ......... E04D 13/0351  |
| WO | WO-2020147906 A1 | * | 7/2020  | ............. E04D 13/03 |
| WO | WO-2020147907 A1 | * | 7/2020  | ............. E04D 13/03 |
| WO | WO-2021228713 A1 | * | 11/2021 | ............. E04D 13/03 |

OTHER PUBLICATIONS

International Search Report for corresponding application PCT/DK2020/050008 filed Jan. 13, 2020; Mail date Apr. 3, 2020.
International Search Report for corresponding application PCT/DK2020/050009 filed Jan. 13, 2020; Mail date Mar. 30, 2020.
International Search Report for corresponding application PCT/DK2020/050010 filed Jan. 13, 2020; Mail date Mar. 25, 2020.
International Search Report for corresponding application PCT/DK2020/050011 filed Jan. 13, 2020; Mail date Apr. 7, 2020.
International Search Report for corresponding application PCT/DK2020/050012 filed Jan. 13, 2020; Mail date Apr. 9, 2020.
International Search Report for corresponding application PCT/DK2020/050013 filed Jan. 13, 2020; Mail date Mar. 19, 2020.
International Search Report for corresponding application PCT/DK2020/050014 filed Jan. 13, 2020; Mail date Apr. 14, 2020.
International Search Report for corresponding application PCT/DK2020/050015 filed Jan. 13, 2020; Report dated Mar. 27, 2020.
International Search Report for corresponding application PCT/DK2020/050016 filed Jan. 13, 2020; Mail date Apr. 1, 2020.
International Search Report for corresponding application PCT/DK2020/050017 filed Jan. 13, 2020; Mail date Feb. 18, 2020.
International Search Report for corresponding application PCT/DK2020/050018 filed Jan. 13, 2020; Mail date Feb. 18, 2020.
Written Opinion for corresponding application PCT/DK2020/050008 filed Jan. 13, 2020; Mail date Apr. 3, 2020.
Written Opinion for corresponding application PCT/DK2020/050009 filed Jan. 13, 2020; Mail date Mar. 30, 2020.
Written Opinion for corresponding application PCT/DK2020/050010 filed Jan. 13, 2020; Mail date Mar. 25, 2020.
Written Opinion for corresponding application PCT/DK2020/050011 filed Jan. 13, 2020; Mail date Apr. 7, 2020.
Written Opinion for corresponding application PCT/DK2020/050012 filed Jan. 13, 2020; Mail date Apr. 9, 2020.
Written Opinion for corresponding application PCT/DK2020/050013 filed Jan. 13, 2020; Mail date Mar. 19, 2020.
Written Opinion for corresponding application PCT/DK2020/050014 filed Jan. 13, 2020; Mail date Apr. 14, 2020.
Written Opinion for corresponding application PCT/DK2020/050015 filed Jan. 13, 2020; Report dated Mar. 27, 2020.
Written Opinion for corresponding application PCT/DK2020/050016 filed Jan. 13, 2020; Mail date Apr. 1, 2020.
Written Opinion for corresponding application PCT/DK2020/050017 filed Jan. 13, 2020; Mail date Feb. 18, 2020.
Written Opinion for corresponding application PCT/DK2020/050018 filed Jan. 13, 2020; Mail date Feb. 18, 2020.

* cited by examiner

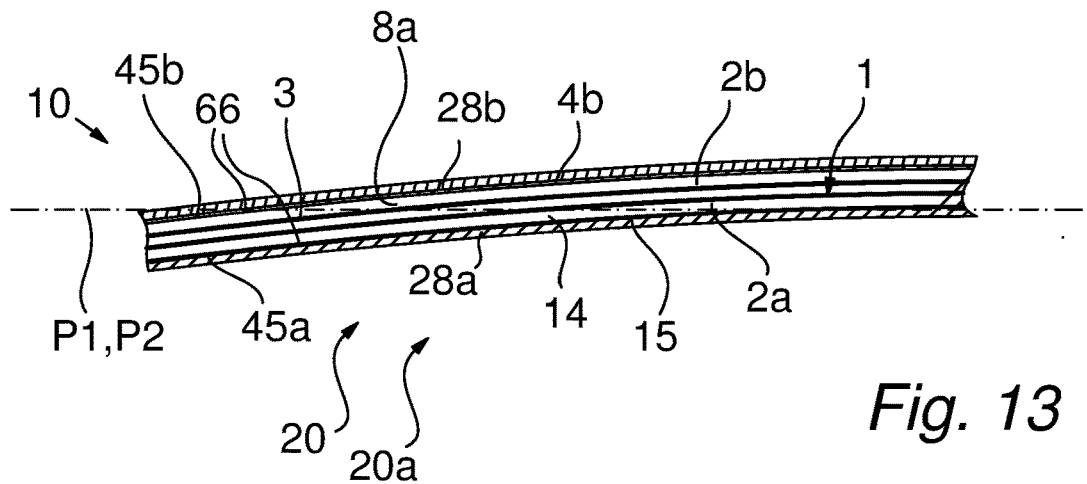
Fig. 13
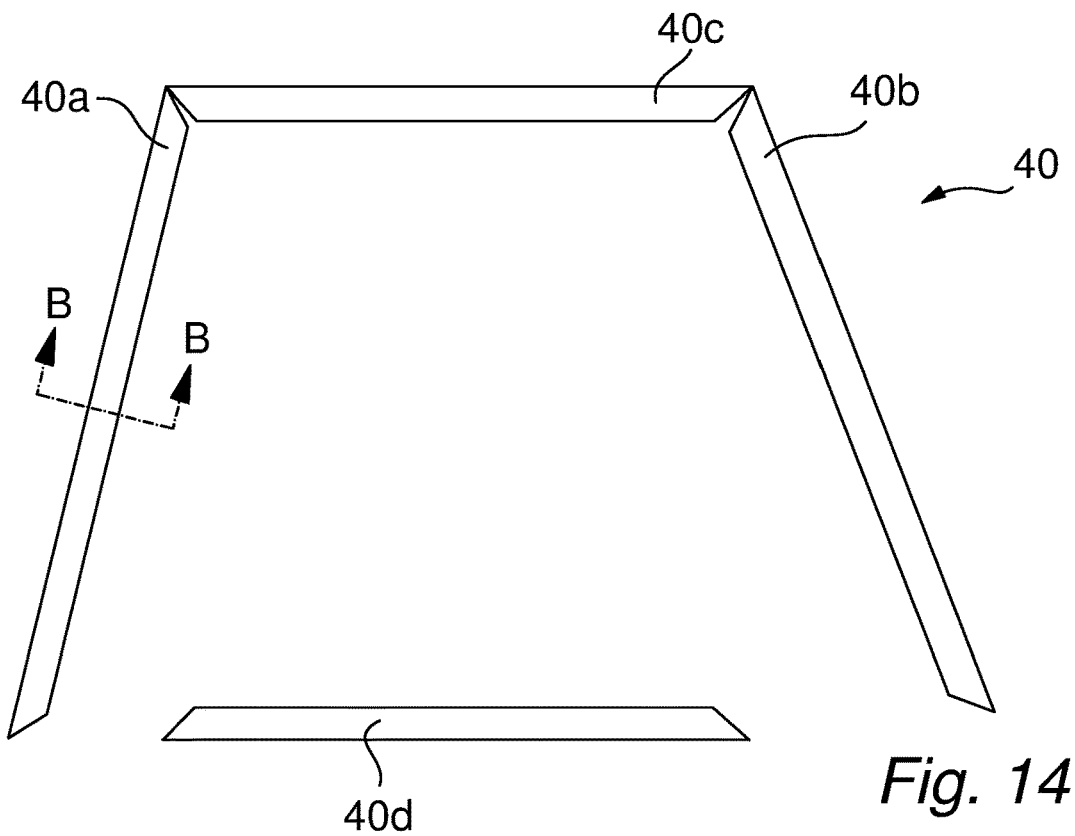
Fig. 14
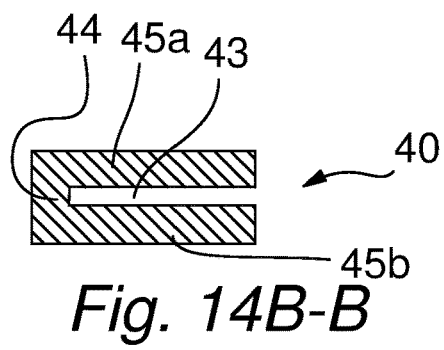
Fig. 14B-B

FRAME SOLUTION FOR LAMINATED VIG UNIT

The present disclosure relates to a vacuum insulated glass (VIG) unit frame assembly, a retrofitting system, and a laminated vacuum insulated glass unit.

BACKGROUND

Vacuum insulated glass (VIG) units provides several advantages such as good insulated properties and reduced thickness. A VIG unit may typically comprise glass sheets kept separated by support structures arranged in an airtight and evacuated gap between the glass sheets. To provide an airtight gap, an edge sealing is applied along the glass sheet edges so as to enclose the gap between the glass sheets. This edge seal may be made from e.g. a glass frit material such as low melting point glass frit material which is applied along the edges of a glass sheet and then subsequently heated in order to melt the glass material to provide an airtight and strong edge sealing.

Patent document U.S. Pat. No. 9,447,627B2 discloses a window frame unit for vacuum insulated glass unit. A base member and a glazing member of a frame provides a recess wherein a distal edge of a VIG unit is arranged. The recess is disclosed to be designed to accommodate distortion of the VIG unit rather than constraining the VIG unit at the distal edge of the VIG unit. This is obtained by a resilient, flexible tab of a glazing member that is/are snapped into engagement with a base member of the frame, so that the tabs may allow the glazing member to pivot to accommodate distortion of the VIG unit.

Patent documents U.S. Pat. No. 6,435,630 B1 and JP2007132637 discloses other solutions for holding a VIG unit. Patent document EP2169172 B1 discloses a further solution where a frame holds a VIG unit by means of an adhesive at a surface facing a part of the frame.

It however appears that problems still exists when arranging a VIG unit in a frame to provide a window or door for e.g. covering building apertures.

The present disclosure provides one or more solutions where a VIG unit is arranged in a frame, which may e.g. help to improve or ensure the lifetime, such as the estimated lifetime, of the VIG unit, provide a more simple and/or, mechanical solution for holding a VIG unit in/at a frame, provide a solution that may be used under varying climatic conditions, and/or provide a solution which is advantageous from a manufacturing point of view.

SUMMARY

VIG units are normally made from glass sheets kept separated by support structures such as pillars arranged in an airtight and evacuated gap between the glass sheets. To provide the airtight gap, an edge sealing is provided along the glass sheet edges so as to enclose the gap between the glass sheets. This edge seal may be made from e.g. a glass frit material such as low melting point glass frit material which is applied along the edges of a glass sheet and then subsequently heated in order to melt the glass material to provide an airtight and strong edge sealing. The edge seal may alternatively be made from a metal seal which is heated to a melting point and then cooled to cure.

The gap(s) between the glass sheets are normally evacuated by means of an evacuation cup connected to an evacuation pump, and the evacuation cup is arranged to cover an evacuation hole in one of the glass sheets for the VIG unit, which is then sealed after the evacuation of the gap. Alternatively, the gap may be evacuated in an evacuation chamber enclosing the entire VIG unit. The gap is normally evacuated to below $10^{-3}$ bar, such as below $10^{-4}$ bar, e.g. to about or below $10^{-3}$ mbar.

The VIG unit is normally subjected to significant temperature differences $\Delta T$ between the VIG unit glass sheets due to the good insulation capabilities of the VIG unit. As the edge seal for sealing the gap between the VIG unit glass sheets is normally very stiff in nature, the temperature difference $\Delta T$ between the glass sheets causes the VIG unit to deflect (also known as thermal bending, thermal deflection or thermal distortion), as the hotter glass sheet of the VIG unit will expand compared to the colder of the glass sheets.

For example VIG units according to aspects of the present disclosure may provide a $U_g$-value below 0.7 W/(m$^2$K), such as below 0.6 W/(m$^2$K), e.g. below 0.5 W/(m$^2$K) such as below 0.4 W/(m$^2$K), and such VIG units may suffer from increased thermal deflection due to the good insulation provided by means of the VIG unit. This low $U_g$-value may be obtained by means of the evacuation of the gap between the VIG glass sheets, e.g. in combination with one or more one or more of

- One or more low-e coatings such as thin tin dioxide or thin silver layers or any other suitable low e-coating layers at e.g. the inner surface(s) of the glass sheets of the VIG unit facing the VIG unit gap,
- a larger/increased support structure distance, such as above 3 or above 4 centimetres between neighbouring support structures in the VIG unit gap to reduce the number of potential "cold-bridges" provided by the support structures,
- by using support structures/pillars of a material having a low thermal conductivity and/or a small size,
- By providing a 3-layer VIG unit (i.e. with two evacuated gaps)
- By providing a Hybrid VIG unit,
- And/or the like.

The present disclosure relates to a vacuum insulated glass (VIG) unit frame assembly, wherein said vacuum insulated glass unit frame assembly comprises a frame comprising elongated frame profile arrangements which frames a vacuum insulated glass unit in a frame opening. The vacuum insulated glass unit comprises at least two glass sheets separated by a gap between said glass sheets, and a plurality of support structures are distributed in said gap. Said gap is sealed by means of a sealing system which seals an evacuation hole arranged in a first of said glass sheets and extending to the gap, and a lamination glass sheet is attached to an outer major surface of said first glass sheet by means of a lamination layer, wherein said sealing system extends into a hole in the lamination glass sheet. An edge of the vacuum insulated glass unit proximate the hole in the lamination glass sheet, said sealing system and said hole in the lamination glass sheet into which the sealing system extends are covered by the frame.

The VIG unit may thermally deflect over time due to a temperature difference between the VIG unit glass sheets. This temperature difference may change over time, and may induce varying stress conditions in the VIG unit. A temperature difference between the VIG unit glass sheets may provide a thermal deflection of the VIG unit edges, and the amount of thermal deflection is dependent on the size of the temperature difference $\Delta T=T1-T2$, where T1 is the temperature of one VIG unit glass sheet, and the temperature T2 is the temperature of the other VIG unit glass sheet. The operational sign of the resulting temperature difference ΔT determines to which side of the VIG unit frame assembly, the VIG unit's edges deflects relative to the frame opening plane due to the temperature difference.

The present inventors have seen indications that an inappropriate constraining of the VIG unit's thermal deflection along/at the VIG unit edges by the frame assembly may induce a larger stress at the VIG unit edges or corner areas, such as in an edge sealing the VIG unit gap of the VIG unit at the glass sheet edges. This may increase the risk that the VIG unit is damaged over time, so that the reduced pressure in the gap of the VIG unit is released to be that of the ambient pressure of the VIG unit, and this requires a replacement of the entire VIG unit.

For example, the present inventors have seen that the edges of the VIG unit glass sheets may tend to describe an "edge deflection curve" when the VIG unit is subjected to temperature differences, and this may be caused by the properties of the VIG unit such as the rigidity of the edge sealing solution for sealing the VIG gap along the edges of the VIG unit. The magnitude of the deflection of the edge may hence vary between the corners of the respective edge between which the respective edge terminates. Tests confirmed that such edge deflection curves occur when the VIG unit is subjected to temperature differences.

The edge of the vacuum insulated glass unit may hence thermally deflect in a direction perpendicular to a frame opening plane extending in the frame opening between the elongated frame profile arrangements due to the temperature difference.

Providing the sealing system so that it is covered by the frame may e.g. provide aesthetic advantages and may help to provide a solution where the sealing system is protected. The lamination glass sheet encloses the sealing system in the hole in the lamination glass sheet. This may e.g. help to protect the sealing system in the frame during movements of the VIG unit relative to the frame or together with the frame, caused by varying temperature difference between the glass sheets of the VIG unit. Hence, this may help to enable providing a more space saving frame solution since the frame itself may not need the same degree of protection system/space for the sealing system.

In aspects of the present disclosure, the lamination glass sheet may be an annealed glass sheet or a tempered, such as thermally tempered, glass sheet. The lamination glass sheet may e.g. have a thickness between 1.5 mm and 5 mm, such as between 2 mm and 4 mm, e.g. around 3 mm.

In one or more aspects of the present disclosure, one or both of the VIG unit glass sheet enclosing the evacuated gap may be tempered glass sheets, e.g. thermally tempered glass sheets. A tempered glass sheet may provide increased safety and/or strength of the VIG unit. In other aspects of the present disclosure, at least one of said glass sheets of the VIG unit may be an annealed glass sheet.

The sealing system for sealing the evacuation hole may e.g. be a sealing system comprising an evacuation tube (that is sealed) and a sealing material such as melted glass material such as a solder glass material, or metal solder providing a sealing between the tube and the VIG unit. In other aspects of the present disclosure, the evacuation tube may be omitted, and the sealing material such as solder glass or metal solder may be used alone for sealing the evacuation hole.

In one or more aspects of the present disclosure, a fixation system provides fixation of the vacuum insulated glass unit at opposite, outer surfaces of the vacuum insulated glass unit along and opposite to an edge seal of the vacuum insulated glass unit which seals the evacuated gap between the glass sheets of the vacuum insulated glass unit.

At least a part of the edge seal is thus provided between the locations where the fixation system such as fixation arrangements provides fixation/holding of the VIG unit in the frame. Hence, when outer forces strikes the VIG unit, the forces are transferred to the frame assembly at a location where the edge seal of the VIG unit is placed. This may e.g. help to provide a more space saving frame solution and/or help to provide a VIG unit frame assembly that may last longer.

In one or more aspects of the present disclosure, said frame comprises a recessed portion which is provided between holding members arranged at opposite outwardly facing surfaces of the vacuum insulated glass unit, and wherein an edge of the vacuum insulated glass unit extends into the recessed portion so that the sealing system and the hole in the lamination glass sheet are covered by the frame.

In one or more aspects of the present disclosure, the hole in the lamination glass sheet receiving the sealing system may be positioned between said holding members.

This may e.g. help to provide aesthetic advantages and/or help to provide a simple mechanical solution for protecting the sealing system and providing a space saving frame.

In one or more aspects of the present disclosure, one or more flexible connection arrangements connects a holding part comprising said holding members to elongated frame profile arrangements of the frame, wherein said flexible connection arrangements are configured to flex when said vacuum insulated glass unit exerts a bending moment on the holding part, so that the holding part will move relative to the elongated frame profile arrangements to which the individual holding part is connected.

The flexible connection arrangement is configured to flex when the VIG unit is subjected to temperature differences between the VIG unit glass sheets enclosing the evacuated gap and hence applies a bending moment on the holding part. This allows a thermal deflection of the VIG unit relative to the elongated profiles. This may help to provide a longer lasting VIG unit, which may e.g. last longer despite being subjected to varying temperature differences. Also or alternatively, it may provide a more cost efficient solution as the same frame assembly may be used in a range of varying climates, and/or in that the same frame assembly system may be utilized for varying sizes of VIG units.

The flexible connection arrangement may thus be deflected by the VIG unit's thermal deflection changes due to a varying temperature difference between the VIG unit glass sheets, hence allowing the VIG unit and the edges of this to thermally deflect.

In one or more aspects of the present disclosure, said flexible connection arrangements may comprises one or more wall members configured to provide said flexing, such as wherein a wall member of said one or more wall members of the flexible connection arrangement is configured to provide or support one of said holding members of the holding part.

This may e.g. help to provide a space saving and/or more simple, mechanical solution.

The flexible connection arrangements may e.g. in one or more aspects of the present disclosure comprise one or more wall members arranged opposite to an outwardly facing major surface of the vacuum insulated glass unit. This may be advantageous as this may e.g. help to provide a space saving, and yet flexible, frame solution, for example, it may provide a more narrow frame solution. However, the wall member(s) may also in one or more other aspects of the present disclosure extend in a direction away from such a space, and not into the space.

In one or more aspects of the present disclosure, a flexing space is provided between an outwardly facing major surface of the vacuum insulated glass unit and said elongated frame profile arrangements to which the individual holding part is connected, and wherein said vacuum insulated glass unit is configured to flex towards and away from said flexing space in response to said bending moment.

Hence, when the flexing due to said bending moment exerted by the vacuum insulated glass unit, and caused by a thermal deflection of the VIG unit edge is provided, the resulting movement of the VIG unit may be allowed into and away from the flexing space.

This may e.g. help to provide a space saving frame solution, and/or help to provide a flexible frame solution that can flex in response to the bending moment subjected to the holding part due to a thermal deflection of the VIG unit.

In aspects, the holding part may also be arranged so as to flex towards and away from the flexing space in response to said bending moment.

In one or more aspects of the present disclosure, one or more distancing walls of the flexible connection arrangement may be configured to provide said flexing space.

This may e.g. help to provide a simple mechanical solution for the frame assembly, and/or help to provide a more controlled flexing of the VIG unit edge(s).

The holding member may thus in aspects of the present disclosure be arranged to suspend the vacuum insulated glass unit from the elongated frame profile arrangements to which the holding part is connected.

In one or more aspects of the present disclosure, one or more wall portions of the flexible connection arrangement, such as distancing walls of the flexible connection arrangement providing said flexing space, may be arranged in said flexing space. This may e.g. help to provide a space saving frame solution, such as a narrower frame solution. The one or more wall portions of the flexible connection arrangement may however in other embodiments of the present disclosure be arranged outside the flexing space.

In one or more aspects of the present disclosure, the maximum distance between an outer surface of the elongated frame profile such as a sash profile arrangement facing the flexing space, and a surface of a holding member proximate to and facing the flexing space may be between 0.4 cm and 15 cm, such as between 0.5 cm and 10 cm, such as between 0.7 and 7 cm, e.g. between 1cm and 6 cm when the temperature difference ($\Delta T=T1-T2$) of the glass sheets of the vacuum insulated glass unit is 0°.

In one or more aspects of the present disclosure, the minimum distance between an outer surface of the elongated frame profile such as a sash profile arrangement facing the flexing space, and a surface of a holding member proximate to and facing the flexing space may be at least 0.4 cm, such as at least 0.5 cm, e.g. at least 1 cm, such as at least 1.5 cm when the temperature difference ($\Delta T=T1-T2$) of the glass sheets ($2a$, $2b$) of the vacuum insulated glass unit is 0°.

This distance between the outer surface of the elongated frame profile arrangement facing the flexing space, and a surface of a holding member proximate to and facing the flexing space may e.g. help to provide that the VIG unit is allowed to flex sufficiently relative to the elongated member to which the flexible connection arrangement is connected, in response to a thermal deflection of the VIG unit edge. The distance may e.g. dependent on the VIG unit size (height and/or width) and/or the layout of the flexible connection system. This distance may in one or more aspects of the present disclosure apply for one or more positions along the edge seal, or along the entire edge seal. The said distance may e.g. be determined substantially perpendicularly to the outer surface of the VIG unit facing the flexing space, at one or more positions opposite to the edge seal. It is understood that the distance may vary as the temperature difference varies, and thus causes a flexing of the flexible connection arrangement.

In one or more aspects of the present disclosure, said vacuum insulated glass unit may be fixed between holding members by means of fixation arrangements arranged between the respective holding member and an outwardly facing surface of the vacuum insulated glass unit.

This may e.g. help to provide a sufficient fixation of the VIG unit between the holding members, and/or help to provide a mechanically simple fixation solution.

In one or more aspects of the present disclosure, said fixation arrangements may comprise one or more suspension elements compressed between a first of said holding members and one of said opposite outwardly facing surfaces, and one or more resilient suspension elements compressed between a second of said holding members and the other of said opposite outwardly facing surfaces, wherein said compressed, resilient suspension elements provides a holding force towards said opposite outwardly facing surfaces of the vacuum insulated glass unit so as to suspend the vacuum insulated glass unit between said first and second holding members, and wherein each of said compressed, resilient suspension elements are configured to be further compressed or expand in response to said thermal deflection of the edge of the VIG unit due to a temperature difference ($\Delta T=T1-T2$) between the two glass sheets.

This may help to provide an improved fixation of the VIG unit in a frame, where the VIG unit edge is allowed to deflect when subjected to varying temperature differences between the glass sheets of the VG unit. For example, it may help to reduce stress conditions in the VIG unit edge.

The magnitude of the thermal deflection of the respective VUG unit edge may e.g. be determined relative to a plane extending in said frame opening between the elongated frame profile arrangements due to the temperature difference. The VIG unit edges may thus describe a "deflection curve", and the compressed resilient suspension elements are configured to follow/adapt to this deflection curve by either expanding or be further compressed.

This may provide that the compression of one of the resilient suspension elements may become larger near the corner where the respective VIG edge terminates, than the compression of the same (or another) resilient suspension element at the same side of the VIG unit, but at another a position closer to the centre of the respective edge. In the same way, the other suspension element(s) at the other side of the VIG unit may simultaneously become less compressed near the corner where the same VIG edge terminates, and become more compressed at a position closer to the centre, such as substantially at the centre of the respective edge.

In one or more aspects of the present disclosure, the compression and expansion of the resilient suspension elements at the ⅛, such as the ¹/₁₀, such as ¹/₁₂ of the length of the vacuum insulated glass unit edge nearest a corner where the respective edge terminates, is configured to be larger than the compression and expansion, respectively, of the same resilient suspension elements at a position closer to the centre of the respective edge.

In one or more aspects of the present disclosure, said resilient suspension elements may be foam elements, rubber elements, such as substantially solid rubber elements from a rubber material such as natural rubber and/or synthetic rubber, and/or be made from a plastic material or a silicone material.

In one or more aspects of the present disclosure, said resilient suspension elements may have a height of at least 5 mm such as at least 8 mm such as at least 10 mm, for example at least 12 mm in an uncompressed state.

This may help to provide a solution where a sufficient tightening between the VIG unit and the frame assembly may be provided, and/or provide a fixation solution that may sufficiently adapt to the thermal deflection of the VIG unit.

In one or more aspects of the present disclosure, resilient gaskets placed between VIG unit and the frame may have a height of between 7 mm and 30 mm, such as between 8 mm and 20 mm, e.g. between 10 mm and 16 mm in an uncompressed state.

In one or more aspects of the present disclosure, said resilient gasket may have a thickness/height above 4 mm, such as above 5 mm, for example above 6 mm at a temperature difference between the VIG unit glass sheets of substantially 0° C. when arranged between the VIG unit and frame. This thickness may in aspects be between 4 mm and 30 mm, for example between 4 mm and 13 mm, such as between 4 mm and 10 mm, for example between 5 and 10 mm, at a temperature difference between the two glass sheets of the vacuum insulated glass unit of substantially 0° C. The thickness is measured in a direction perpendicular to the outer major surface of the VIG unit.

The pre-compression of each the suspension elements may in embodiments of the present disclosure be at least 3 mm such as at least 4 mm, e.g. at least 6 mm at a temperature difference $\Delta T$ between the VIG unit glass sheets enclosing the gap of 0° C.

In one or more aspects of the present disclosure, one or both of said fixation arrangements may be elongated gasket strips arranged to extend in a direction parallel to an edge of the vacuum insulated glass unit along which the gasket strip is applied.

This may e.g. help to provide an improved force distribution when the VIG unit is suspended between the compressed, resilient suspension elements and/or help to provide an improved air and/or water tightening. In aspects, the elongated fixation arrangements may extend substantially all the way between the corners of the VIG unit to e.g. provide an improved air and/or water tightening.

In other aspects of the present disclosure, the fixation arrangements may comprise a plurality of discretely arranged fixation arrangements that are distributed along the respective edge to be fixated to the frame.

In one or more aspects of the present disclosure, said hole in the lamination glass sheet receiving the sealing system may be positioned between one of said fixation arrangements and an elongated, resilient tightening gasket or sealing, such as a resilient gasket or sealing, configured to provide a tightening between a major outer surface of the lamination glass sheet and said frame.

This may e.g. help to provide a water and/or air tightening between the frame and the vacuum insulated glass unit, thus helping to reduce heat transfer, and/or to provide a water tightening to avoid rain water or condensation on the major outwardly facing surfaces of the VIG unit arranged in the frame opening from entering parts of the frame.

The sealing or gasket may in aspects of the present disclosure be configured to be more compressed or deflected, or be less compressed or deflected, in response to the thermal edge deflection of the edge of the VIG unit, thereby keeping a tightening function when the temperature difference between the glass sheets of VIG unit changes.

In one or more aspects of the present disclosure, said holding members may be interconnected by an interconnection wall integrated in the same frame profile which is an extruded, moulded and/or pultruded profile.

This may e.g. help to provide a cost efficient and/or fast manufacturing of the frame profile. Also or alternatively, this frame profile may be configured to be connected to the elongated frame profile arrangement, and hence, an advantageous manufacturing of the VIG unit frame assembly may be obtained, or advantageous thermal characteristic may be obtained.

The interconnecting wall part interconnects said holding members and provides a bottom wall member of the recess receiving the vacuum insulated glass unit edge. This may e.g. help to provide a simple holding part, such as a C-shaped holding part, that may be easy to manufacture.

In one or more aspects of the present disclosure, one or more of said flexible connection arrangements and/or holding members is/are elongated profiles such as elongated walls extending in the longitudinal direction of the edge of the vacuum insulated glass unit.

This may e.g. help to provide a solution that may be easy and/or cost efficient to manufacture. Also or alternatively, it may help to provide a solution where tightening between the frame opening and the rest of the frame may be simpler and/or provide a solution giving an improved support of the VIG unit.

In one or more other aspects, the respective frame profile arrangement may comprise a single elongated flexible connection arrangement portion and/or holding part extending at the longitudinal direction of two, three or four edges of the vacuum insulated glass unit.

In one or more aspects of the present disclosure, one or more of said elongated holding parts and/or elongated flexible connection arrangements may extend at least 30%, such as at least 50%, such as at least 80%, e.g. at least 95% of the length of the edge of the vacuum insulated glass unit extending into said the recess.

In one or more aspects of the present disclosure, one or more of said elongated holding members and/or elongated flexible members may extend less than least 90%, such as less than 80%, e.g. less than 60%, of the length of the respective edge of the VIG unit.

In one or more aspects of the present disclosure, the magnitude of the thermal deflection of the vacuum insulated glass unit edges held by said frame is configured to vary along the respective vacuum insulated glass unit edge between corners where the respective edge terminates, due to a temperature difference ($\Delta T=T1-T2$) between the two glass sheets.

This may help to provide a solution where the risk of the VG unit breaking due to thermal deflection of the VIG unit, is reduced. The magnitude of the thermal deflection of the vacuum insulated glass unit edge may change over time and even be provided in different deflection directions over time when the temperature difference between the VIG unit glass sheets enclosing the evacuated gap changes. The frame may be configured to handle and allow such deflections, and thus help to provide a longer lasting VIG unit as it may help to reduce stress in the VIG unit such as stress in the edge seal.

The magnitude of the bending moment exerted on the frame by the vacuum insulated glass unit may be configured to vary between the corners where the edge of the vacuum insulated glass unit terminates, due to a temperature difference $\Delta T=T1-T2$ between the two glass sheets of the VIG unit. Hence, the frame may in aspects be configured to allow the magnitude of the thermal deflection of the edge to vary between the corners in response to the varying magnitude of the bending moment.

In one or more aspects of the present disclosure, said frame comprises substantially parallel, elongated top and bottom frame profile arrangements, and substantially parallel, elongated side frame profile arrangements,
  wherein two, three or all of said top, bottom and/or side frame profile arrangements at least partly, such as fully, encloses the edges of the vacuum insulated glass unit, where one of said elongated frame profile arrangements covers the sealing system, and
  wherein all edges of the vacuum insulated glass unit are allowed to provide a thermal edge deflection relative to and/or together with one or more parts of said frame profile arrangements so that the magnitude of the thermal edge deflection varies between corners of the respective edge when the temperature difference ($\Delta T=T1-T2$) between the glass sheets of the vacuum insulated glass unit is 65° C.

The bottom frame profile arrangement may be of a different design/constitution than the side and top profile frame arrangements, as it may e.g. comprise a water drainage system for draining water from the surface of the vacuum insulated glass (VIG) unit away from the vacuum insulated glass (VIG) unit frame assembly which is not present at the side and top profile frame arrangements.

In one or more aspects of the present disclosure, two or more of said top, bottom or side frame profile arrangements each comprise a holding part, which holds the vacuum insulated glass unit between two holding members as described e.g. above or below. For example side frame profile arrangements may both comprise a holding part, and the same may the top profile frame arrangement and/or bottom profile frame arrangement.

Steady state Simulation results have indicated that even though a lamination glass sheet may restrict the thermal deflection of the VIG unit edges with between 20% to 70% compared to free bending where the lamination glass sheet is not present, it may still be relevant to allow said edge deflection in the frame, as stresses in the VIG unit glass sheets and/or the edge sealing may still become significant during thermal deflection.

In one or more aspects of the present disclosure, the largest total edge deflection of any of the edges of the vacuum insulated glass unit, at a temperature difference ($\Delta T=T1-T2$) between the two glass sheets of 65° C. as compared to the vacuum insulated glass unit at a temperature difference ($\Delta T=T1-T2$) of 0° C. is at least 2 mm, such as in the range of 2 to 40 mm, such as in the range of 5 to 35, mm, preferably in the range of 8 to 20 mm.

In one or more aspects of the present disclosure, the largest total edge deflection of any of the edges of the vacuum insulated glass unit at a temperature difference ($\Delta T=T1-T2$) between the two glass sheets of 65° C. as compared to the vacuum insulated glass unit at a temperature difference ($\Delta T=T1-T2$) of 0° C. may be at least 0.3% of the length of the deflecting edge, such as in the range of 0.3% to 3.5% of the length of the deflecting edge, such as in the range of 0.4% to 2% of the length of the deflecting edge, such as in the range of 0.6% to 1.5% of the length of the deflecting edge.

Generally, the edges of the vacuum insulated glass unit may thermally deflect as described above in a direction perpendicular to a frame opening plane extending in the frame opening between the elongated frame profile arrangements, due to the temperature difference.

According to a further aspect of the present disclosure, the largest total edge deflection of any of the edges of the vacuum insulated glass unit perpendicular to a frame opening plane defined by the frame, at a temperature difference ($\Delta T=T1-T2$) between the two glass sheets of 40° C. as compared to the vacuum insulated glass unit at a temperature difference ($\Delta T=T1-T2$) of 0° C. is at least 1 mm, such as in the range of 1 to 25 mm, such as in the range of 3 to 15 mm, preferably in the range of 4 to 12 mm.

According to a further aspect of the present disclosure, the largest total edge deflection in said deflection direction (D1, D2) of any of the edges (8a-8d) of the vacuum insulated glass unit perpendicular to a frame opening plane defined by the frame, at a temperature difference ($\Delta T=T1-T2$) between the two glass sheets of 40° C. as compared to the vacuum insulated glass unit at a temperature difference of 0° C. is at least 0.15% of the length of the deflecting edge, such as in the range of 0.15% to 3% of the length of the deflecting edge, such as in the range of 0.25% to 1.8% of the length of the deflecting edge, such as in the range of 0.35% to 1.2% of the length of the deflecting edge.

In one or more aspects of the present disclosure, said vacuum insulated glass unit frame assembly may be a building aperture cover such as a door or a window, such as a roof window.

VIG units may generally provide good heat insulation and/or other advantages in building aperture covers when compared to windows or doors comprising gas insulated glass units.

The present inventors have found that computer simulations revealed that in certain situations when a VIG unit is arranged in a roof window so that the major outer surfaces are not completely vertical, gravity acts on the VIG unit and may cause a further deflection of the edges of the VIG unit. This may in some situations add on to the already present thermal deflection of the VIG unit edges due to a temperature difference between the VIG units. Hence a "worse case" scenario may be if the hotter surface of the VIG unit is the interior VIG unit glass sheet surface (often a surface of a lamination glass sheet in roof windows), as both gravity and thermal deflection acts in the same deflection direction. The present solution may be advantageous in order to also cope such scenarios in roof window solutions.

In aspects of the present disclosure, the VIG unit frame assembly may be a window or door sash.

Windows and doors arranged in outer walls of a building and arranged to cover a building aperture in that outer building wall to allow sunlight to enter a room in the building from the exterior of the building may be largely exposed to varying temperature differences between the VIG unit glass sheet over the lifetime of the VIG unit frame assembly. Also the climatic condition varies largely dependent on the geographical location where the window or door is installed and/or may vary dependent on the type of window or door. The present disclosure may provide a solution that may be advantageous and suitable for such windows or doors comprising a VIG unit. It may though also be suitable to use in refrigerators, cooler covers or doors, or as or in oven doors.

In one or more aspects of the present disclosure, said sealing system such as a free evacuation tube top distant to the VIG unit gap, is placed below the outer surface of the lamination glass sheet.

This may e.g. help to provide an improved protection of the VIG unit in the frame, and/or provide more freedom in the design of the frame, such as selected frame heat insulation material, help to provide a more narrow frame solution and/or the like.

In one or more aspects of the present disclosure, the frame may support and fix the VIG unit in the frame, such as in a frame recess, at a position at or proximate to the sealing system.

In one or more aspects of the present disclosure, said fixation system is may be arranged so as to allow a shift in the direction of the thermal deflection of the corners and/or centre parts of the edges of the vacuum insulated glass unit in response to a change in the temperature difference ($\Delta T=T1-T2$) between the two glass sheets of the vacuum insulated glass unit. It is here understood that said change in the temperature difference $\Delta T=T1-T2$ between the two glass sheets of the vacuum insulated glass unit provides a switch between which of the glass sheets that is the hotter glass sheet and the colder glass sheet respectively.

This may e.g. help to provide a more cost efficient solution may be obtained and/or a solution where the VIG unit frame assembly can be used in a larger range of climatic conditions and/or applications.

It is generally understood that the length of the longer opposing edges in aspects of the present disclosure may be in the range of 500 to 3000 millimetres, preferably in the range of 600 to 1300 millimetres. In one or more aspects of the present disclosure, the length ratio between shorter opposing edges and the longer opposing edges may be in the range of 0.3 to 0.9, preferably in the range of 0.35 to 0.85.

In one or more aspects of the present disclosure, said frame, such as the fixation system, e.g. such as the above mentioned fixation arrangements, the flexible connection arrangement and/or the like may be configured to restrict the thermal deflection of the vacuum insulated glass unit edges compared to free, un-constricted thermal deflection of the respective edge.

Restricting the VIG unit edge completely from thermal deflection may cause the VIG unit to break and the pressure in the evacuated gap to equalize to the ambient pressure. However, by restricting the VIG unit edge deflection to a certain amount compared to free deflection and no deflection, this may provide a solution where the VIG unit may be less likely to break over time due to thermal deflections.

The edge deflection may e.g. in aspects be restricted between 20% and 90%, such as between 40-70% compared to free, un-constricted thermal deflection of the respective edge.

In one or more aspects of the present disclosure, a minimum distance may be provided between an outer major surface of the vacuum insulated glass unit and walls of the frame, wherein said minimum distance is at least 4 mm such at least 5 mm, for example at least 6 mm at a temperature difference $\Delta T$ between the two glass sheets of the vacuum insulated glass unit of substantially 0° C. Said minimum distance is measured in a direction perpendicular to the outer major surface of the vacuum insulated glass unit and the frame, such as a frame wall surface facing the major VIG unit surface. This may e.g. provide more space and/or deflection freedom in order to allow the VIG unit to thermally deflect relative to the frame. The minimum distance may provide a space in which a fixation system and/or a resilient tightening gasket is placed.

The present disclosure additionally, in a second aspect, relates to a retrofitting system for retrofitting a vacuum insulated glass unit to a frame originally designed for insulated glass panes, for example gas insulated glass panes, such as windows, of greater thickness than the thickness of the vacuum insulated glass unit, wherein said retro-fitting frame system at least comprises:

a vacuum insulated glass unit comprising at least two glass sheets separated by an evacuated gap between said glass sheets,
wherein a plurality of support structures are distributed in said evacuated gap and wherein said gap is sealed,
wherein a sealing system seals an evacuation hole arranged in a first of said glass sheets and extending to the gap, and
wherein a lamination glass sheet is attached to an outer major surface of said first glass sheet by means of a lamination layer, and wherein said sealing system extends into a hole in the lamination glass sheet, The retro fitting system further comprises:
a plurality of elongated tightening seals/gasket arrangements configured to follow a deflection of the vacuum insulated glass unit when it thermally deflect, so as to provide a water tightening and/or air tightening of a space provided between one or more frame profiles members and an outer surface of the vacuum insulated glass unit when installed at said frame,
one or more fixation arrangements are configured to be placed between a first holding member and an outwardly facing surface of the vacuum insulted glass unit, and one or more further fixation arrangements configured to be placed between a second holding member and an opposite outwardly facing surface of the vacuum insulted glass unit,
wherein said fixation arrangements are configured to hold the vacuum insulated glass unit between said first and second holding members, and
wherein the edge of the vacuum insulated glass unit proximate the hole in the lamination glass sheet, said sealing system and said hole in the lamination glass sheet into which the sealing system extends are configured to be covered in the resulting frame after the retrofitting system is installed.

This may e.g. provide a retro fitting solution providing one or more of the previously mentioned advantages.

In one or more aspects of the second aspect, said retro-fitting system comprises elongated frame profiles to be attached to said frame originally designed for insulated glass panes, for example gas insulated glass panes, of greater thickness than the thickness of the vacuum insulated glass unit, wherein said elongated frame profile comprises walls forming a U-shape providing a recess for receiving the edge of the vacuum insulated glass unit, wherein said fixation arrangements are configured to be placed in a space between the walls of the elongated frame profile and the outwardly facing surface of the vacuum insulated glass unit.

In one or more aspects of the second aspect, said elongated frame profiles and said fixation arrangements are pre-mounted at said vacuum insulated glass unit prior to installation in said frame originally designed for insulated glass panes of greater thickness than the thickness of the vacuum insulated glass unit.

This may e.g. help to reduce the risk of installation errors and/or help to provide a solution that may be faster to install.

In one or more aspects of the second aspect, the position of said hole in the lamination glass sheet is configured to be arranged between one of said fixation arrangements and an elongated, resilient tightening gaskets or sealing of the retrofitting frame system configured to provide a tightening between a major outwardly facing surface of the vacuum insulated glass unit and said frame.

In one or more aspects of the second aspect, said fixation arrangements are elongated gasket strips.

In one or more aspects of the second aspect, said fixation arrangements comprises one or more suspension elements which is/are compressed or is/are configured to be compressed between a first of said holding members and one of said opposite outwardly facing surfaces, and
- one or more resilient suspension elements which is/are compressed or is/are configured to be compressed between a second of said holding members and the other of said opposite outwardly facing surfaces,
- wherein said compressed, resilient suspension elements are configured to provide a holding force towards said opposite outwardly facing surfaces of the vacuum insulated glass unit so as to suspend the vacuum insulated glass unit between said first and second holding members, and
- wherein each of said compressed, resilient suspension elements is configured to be further compressed or expand in response to said thermal deflection of the edge of the VIG unit due to a temperature difference ($\Delta T=T1-T2$) between the two glass sheets.

In one or more aspects of the second aspect, said retrofitting frame system is configured so as to provide a vacuum insulated glass (VIG) unit frame assembly after it has been installed in said frame originally designed for insulated glass panes of greater thickness than the thickness of the vacuum insulated glass unit.

Additionally, the present disclosure relates to a third aspect in the form of a method of retrofitting a vacuum insulated glass unit to a frame originally designed for insulated glass panes such as windows of greater thickness than the vacuum insulated glass unit, wherein said method comprises the steps of: providing a retrofitting system (100), arranging the vacuum insulated glass unit in said frame, and providing the elongated tightening seals/gasket arrangements of the retro fitting system so that they are arranged to follow a deflection of the edges of the vacuum insulated glass unit when they thermally deflect, thereby providing a water tightening and/or air tightening of a space provided between one or more frame profiles members and an outer surface of the vacuum insulated glass unit.

Additionally, the present disclosure relates in a fourth aspect to a laminated vacuum insulated glass unit comprising a linear edge with an edge seal sealing an evacuated gap between glass sheets of the vacuum insulated glass unit,
- wherein the vacuum insulated glass unit is structurally affixed to a frame by means of a fixation system connected to the vacuum insulated glass unit at fixation positions of outwardly facing surfaces of the vacuum insulated glass unit,
- wherein said fixation positions is/are located along and opposite to said edge seal of the vacuum insulated glass unit,
- wherein the evacuated gap is sealed by means of a sealing system which seals an evacuation hole arranged in a first of the glass sheets of the vacuum insulated glass unit and extending to the gap,
- wherein a lamination glass sheet is attached to an outer major surface of said first glass sheet by means of a lamination layer, and wherein said sealing system extends into a hole in the lamination glass sheet, and
- wherein the edge of the vacuum insulated glass unit proximate the hole in the lamination glass sheet, said sealing system and said hole in the lamination glass sheet into which the sealing system extends are covered by the frame.

In aspects of said fourth aspect, said laminated vacuum insulated glass unit is provided by means of a vacuum insulated glass unit frame assembly and/or by means of a retro fitting frame system.

FIGURES

Aspects of the present disclosure will be described in the following with reference to the figures in which:

FIG. 1: Illustrates a VIG unit frame assembly according to embodiments of the present disclosure, FIG. 2: illustrates schematically a VIG unit to be arranged in a frame according to embodiments of the present disclosure, FIGS. 3-4: Illustrates a thermally deflecting VIG unit according to embodiments of the present disclosure, FIG. 5: Illustrates a thermally deflecting VIG unit subjected to varying temperature difference according to embodiments of the present disclosure, FIG. 6: illustrates a VIG unit comprising an evacuation hole sealing system covered by a frame according to embodiments of the present disclosure FIG. 7: illustrates embodiments of the present disclosure fixation arrangements comprises one or more pre-compressed suspension elements, FIG. 8: illustrates a glazing profile and base member profile solution according to embodiments of the present disclosure, FIGS. 9-10: illustrates a VIG unit edge that is configured to thermally deflect relative to holding members of the frame, according to embodiments of the present disclosure, FIG. 11: illustrates embodiments of the present disclosure where a VIG unit frame assembly is a window, FIG. 12: illustrates a flexible connection arrangement connecting a holding part which holds a VIG unit edge to an elongated frame profile arrangement, according to embodiments of the present disclosure, FIG. 13: illustrates holding members that are configured to follow and deflect together with an deflection of a VIG unit edge, according to embodiments of the present disclosure, FIGS. 14-14B-B: illustrates schematically a fixation gasket assembly according to embodiments of the present disclosure, FIG. 15: illustrates discrete holding members distributed along a VIG unit edge according to embodiments of the present disclosure, FIG. 16: illustrates embodiments of the present disclosure where a VIG unit is a hybrid type VIG unit, FIG. 17: illustrates a frame assembly according to further embodiments of the present disclosure, FIGS. 18-19: illustrates retro fitting solutions according to embodiments of the present disclosure, FIG. 20: illustrates a visualized computer simulation of a thermal deflection of a VIG unit, and FIGS. 21-22: illustrates a thermal deflection test of a laminated VIG unit.

DETAILED DESCRIPTION

In relation to the figures described below, where the present disclosure may be described with reference to various embodiments, without limiting the same, it is to be understood that the disclosed embodiments are merely illustrative of the present disclosure that may be embodied in various and alternative forms. The figures are not to scale; some features may be exaggerated or minimized to show details of particular components. Therefore, specific structural and functional details disclosed herein are not to be interpreted as limiting, but merely as a representative basis for e.g. teaching one skilled in the art to variously employ the present disclosure.

FIG. 1 illustrates schematically a vacuum insulated glass unit frame assembly 10 for use as e.g. a building aperture cover such as a window or a door according to embodiments of the present disclosure. The vacuum insulated glass unit frame assembly 10 comprises a vacuum insulated glass (VIG) unit 1, and a frame 20. The frame 20 comprises elongated frame profile arrangements 20a-20d which frames the vacuum insulated glass unit 1 in a frame opening 21, defining a frame opening plane P2.

These elongated frame profile arrangements 20a-20d comprises substantially parallel top and bottom frame profile arrangements 20c, 20d. and substantially parallel side profile frame arrangements 20a, 20b. Two, two, three or all (as illustrated) of said top, bottom and/or side profile frame arrangements 20a-20d at least partly, such as fully, encloses the VIG edges 8a-8d. Two or more of frame profile arrangements 20a, 20b, 20c, 20d may each comprise one or more holding parts 6 and/or one or more flexible connection arrangements 7 as disclosed in more details below.

Gasket arrangements 50a, 50b may in one or more embodiments of the present disclosure be arranged to seal a space between the frame profile arrangements 20a-20d and the VIG unit 1, as e.g. described in more details later on.

As can be seen, the frame 20 may be attached to a fixed frame arrangement 30, such as in case the frame 20 is configured to be opened and closed while hanging from a hinge system (not illustrated) connecting the frame 20 and the fixed frame arrangement 30. In other embodiments, the sash or frame 20 may also be fixed in an un-openable manner to the fixed frame or directly to a building structure.

The frame profile arrangements 20a-20d defines a frame opening 21 plane P2 extending between the frame profile arrangements 20a-20d in the frame opening 21.

Figure 2:
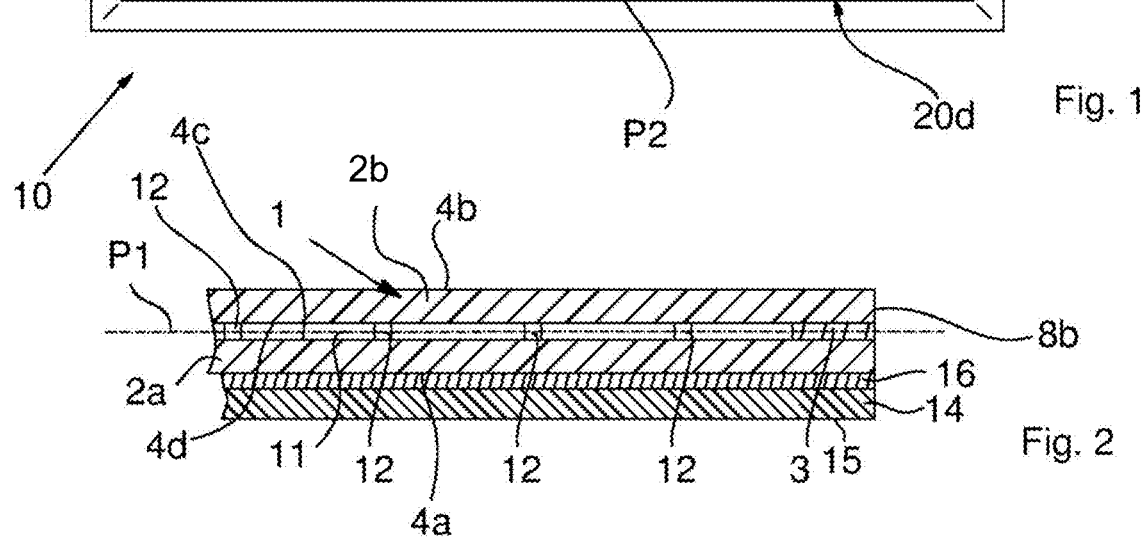

FIG. 2 illustrates schematically a cross sectional view of a rectangular VIG unit 1 to be arranged in the frame 20 according to embodiments of the present disclosure. The VIG unit 1 comprises two glass sheets 2a, 2b such as tempered glass sheets, e.g. thermally tempered glass sheets, but it may also be annealed glass sheets.

The glass sheets 2a, 2b are separated by a gap 11 between the glass sheets 2a, 2b, and a plurality of support structures 12 are distributed in the gap 11. The gap 11 may for example be 0.05-0.5 mm. The gap 11 is sealed by an edge sealing 3, such as a fused edge sealing, which may e.g. be made from a solder glass material, e.g. low melting temperature solder glass material, or a metal solder material.

The support structures 12 may be made from metal, glass or polymer and be arranged in a grid or another pattern. 12 maintain the gap 11 between the glass sheets 2a, 2b when the gap is evacuated to a pressure below e.g. $10^{-3}$ bar, such as below $10^{-4}$ bar, e.g. to about or below $10^{-3}$ mbar. The glass sheets 2a, 2b comprises major surfaces 4c, 4d facing the gap, and the support structures support on these surfaces. The glass sheets also comprises outwardly facing major surfaces 4a, 4b facing away from the gap 11.

The VIG unit's thickness, measured between the outwardly facing surfaces 4a, 4b of the VIG unit may in embodiments be between 4-15 mm such as between 4-12 mm, e.g. 4-10 mm.

Especially if the VIG unit glass sheets 2a, 2b are tempered glass sheets, the distance between neighbouring/adjacent support structures may be above 3 cm or above 4 cm, such as between 3 cm and 6 cm in the evacuated VIG unit gap 11.

As described in more details later on, the VIG unit 1 may also be a laminated VIG unit and/or a VIG unit of a hybrid type comprising a further glass sheet providing a further sealed gap between this glass sheet and the VIG unit that may be filled with a gas.

The VIG unit 1 defines a VIG unit plane P1 that will extend parallel to or coincide with the frame opening 21 plane P2 when the VIG unit is arranged in the frame 20. This plane P1 may e.g. be determined when the VIG unit glass sheets 2a, 2b have the substantially same temperature and no substantial thermal deflection of the VIG unit occur ($\Delta T=0°$ C.).

The VIG unit 1 is a laminated VIG unit 1. Hence, the laminated VIG unit is laminated with a lamination glass sheet 14, such as an annealed glass sheet or a tempered glass sheet. This is laminated to an outer major surface 4a of the VIG glass sheet 2a providing a major surface 4d on which the support structures 12 support in the gap 11. The lamination glass sheet 14 is laminated to the VIG glass sheet 2a by means of a lamination layer 16 such as a polyvinyl butyral (PVB) or ethylene-vinyl acetate (EVA) layer. The lamination glass sheet 14 thus provides the outer major surface 15 of the VIG unit.

The lamination layer 16 may in embodiments of the present disclosure have a thickness between 0.7 and 2.5 mm, such as between 1 mm and 1.8 mm for example around 1.4-1.7 mm. The thickness may vary in case the glass sheet 4a has a surface suffering from roller waves or other unevenness due to the tempering operation provided to temper the glass 2a.

The lamination glass sheet 14 may have a thickness around 2-4 mm, e.g. around 3 mm in embodiments of the present disclosure.

The glass sheets 2a, 2b of the VIG unit may have a thickness between 2-5 mm, such as around 2 mm, 3 mm or 4 mm. The gap 11 measured between the VIG unit glass sheet surfaces 4c, 4d may be between 0.1 to 0.4 mm, such as around 0.15-0.25 mm, in embodiments of the present disclosure.

Figure 3:
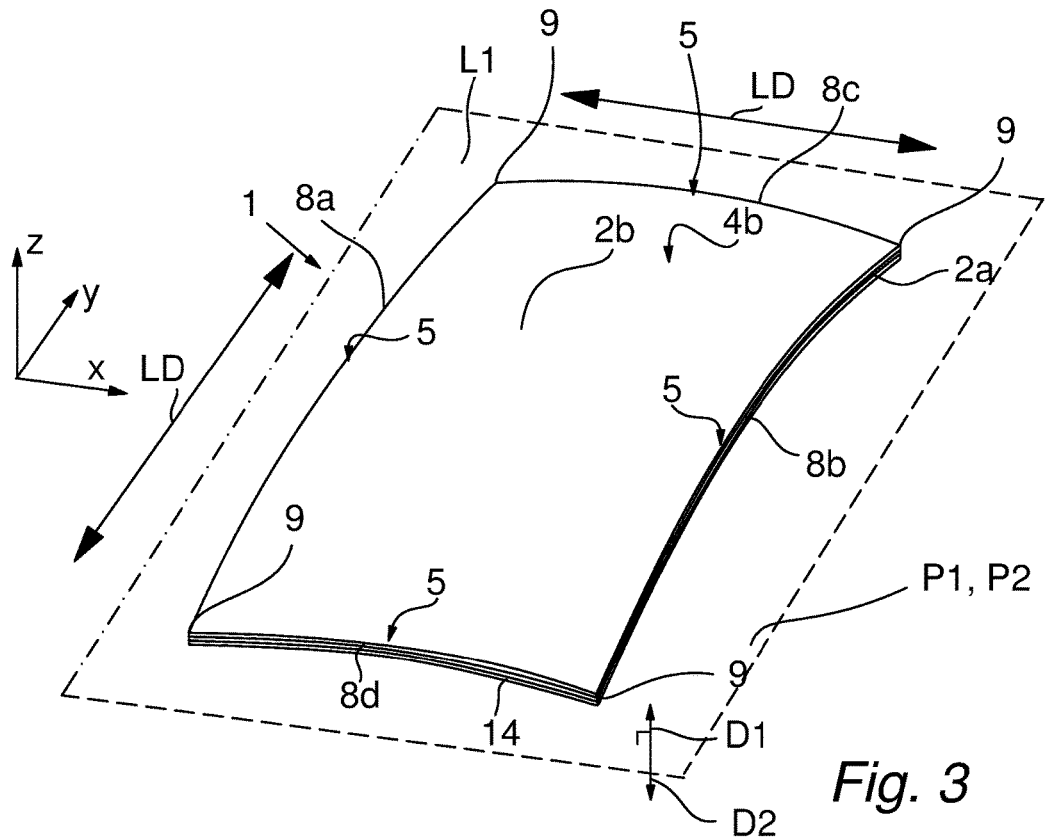
Figure 4:
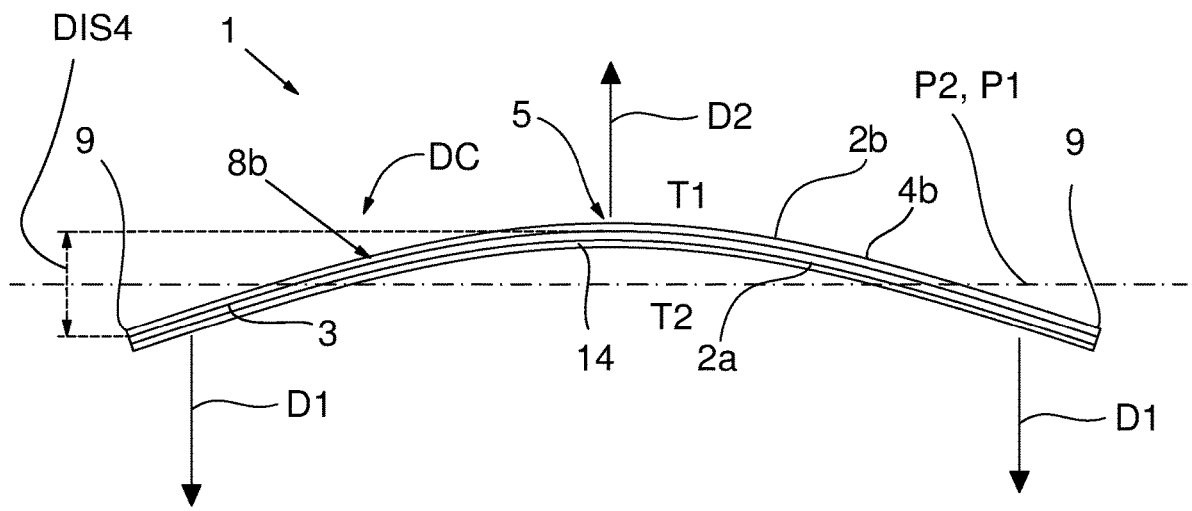

FIGS. 3 and 4 illustrates schematically a VIG unit thermal deflection as a result of a temperature difference $\Delta T=T1-T2$ between the two glass sheets 2a, 2b, according to embodiments of the present disclosure.

In FIG. 3, the VIG unit 1 is shown schematically and in perspective, where it can be seen that the outer major surface 2b of the VIG unit 1 may thus obtain a convex shape when T1 is higher than T2 whereas the outer surface 4a (not visible in FIG. 3) of the other (lower) glass sheet 2a facing the lamination glass 14, and hence also the outer surface 15 of the lamination glass sheet 14 provides a concave shape due to a thermal deflection.

The VIG unit 1 deflects relative to the VIG unit plane P1 (determined where $\Delta T$ is substantially zero) and relative to the frame opening plane P2, in the directions D1, D2 which are perpendicular to the planes P1 and/or P2.

The length of the longer opposing edges 8a, 8b may in aspects of the present disclosure be in the range of 500 to 3000 millimetres, preferably in the range of 600 to 1300 millimetres. In one or more aspects of the present disclosure, the length ratio between shorter opposing edges 8c, 8d and the longer opposing edges 8a, 8b may be in the range of 0.3 to 0.9, such as in the range of 0.35 to 0.85.

The planes P2 and P1 extends in the x-y direction, and the thermal deflection of the VIG unit edges 8a-8d is provided in the z direction relative to the planes P1, P2.

FIG. 4 illustrates schematically and seen from the side onto the long edge 8b, the thermal deflection of the edge 8b. As can be seen, the VIG unit edge 8b may tend to describe a deflection curve DC due to thermal deflection of edge 8b, caused by a temperature difference ΔT=T1−T2 between the two glass sheets 2a, 2b. In the present example, the glass sheet 2b is subjected to a higher temperature T1 than the glass sheet 2a subjected to temperature T2.

The glass sheet 2a may hence be heated by the temperature of the lamination glass sheet 14 and the lamination layer 16, and may thus more slowly change temperature when T2 changes, compared to T1.

The temperature difference ΔT cause the glass sheet 2b to expand more than glass sheet 2a. As the edge seal 3 may provide a very rigid connection between the glass sheets, this causes the VIG unit to thermally deflect, and this temperature difference may cause the edge 8b to describe a deflection curve that varies relative to the frame opening plane P2 and the VIG unit plane P1.

As can be seen from various figures of the present disclosure, the plane P1 and the frame opening plane P2 may coincide. In other embodiments of the present disclosure however, the plane P1 may be parallel to the frame opening plane P2, but may not coincide with the plane.

The outer, major surface 4b of the VIG unit 1 at or near the edge, e.g. at the surface 4b opposite to the edge seal 3 may thus obtain a convex shape when T1 is higher than T2 whereas the outer surface 4a of the other (lower) glass sheet 2a facing the lamination glass 14, and the lamination glass 14, provides a concave shape.

As can be seen, the corners 9 of the VIG unit where the edge 8b terminates may move in a first direction D1 relative to the plane P1 and/or P2, whereas the centre portion 5 (substantially midways between the two corners 9) of the edge 8b, may move in the opposite direction D2 than the first direction D1, relative to the plane P1 and/or P2.

When/if the glass sheet 2b gets hotter than glass sheet 2a, caused by a temperature change of T1 or T2, the corners 9 of the VIG unit moves in the second direction D2 relative to the plane P1 and/or P2, and the centre portion 5 of the edge 8b, move in the first direction D1, relative to the plane P1 and/or P2.

In one or more other embodiments of the present disclosure, the largest total deflection DIS4 of any of the edges 8a-8d of the vacuum insulated glass unit 1, at a temperature difference ΔT=T1−T2 between the two glass sheets 2a, 2b of 40° C. as compared to the vacuum insulated glass unit at a temperature difference (ΔT=T1−T2) of 0° C. may be at least 1 mm, such as in the range of 1 to 25 mm, such as in the range of 3 to 15 mm, preferably in the range of 4 to 12 mm.

In one or more other embodiments of the present disclosure, the largest total edge deflection DIS4 of any of the edges 8a-8d of the vacuum insulated glass unit 1, at a temperature difference ΔT=T1−T2 between the two glass sheets 2a, 2b of 65° C. as compared to the vacuum insulated glass unit at a temperature difference (ΔT=T1−T2) of 0° C. may be at least 0.3% of the length of the deflecting edge, such as in the range of 0.3% to 3.5% of the length of the deflecting edge, such as in the range of 0.4% to 2% of the length of the deflecting edge, such as in the range of 0.6% to 1.5% of the length of the deflecting edge.

In one or more other embodiments of the present disclosure, the largest total deflection of any of the edges 8a-8d of the vacuum insulated glass unit 1, at a temperature difference ΔT=T1−T2 between the two glass sheets 2a, 2b of 40° C. as compared to the vacuum insulated glass unit at a temperature difference of 0° C. is at least 0.15% of the length of the deflecting edge, such as in the range of 0.15% to 3% of the length of the deflecting edge, such as in the range of 0.25% to 1.8% of the length of the deflecting edge, such as in the range of 0.35% to 1.2% of the length of the deflecting edge.

The above mentioned total thermal deflections are provided when the VIG unit is arranged in the frame 20, and is determined relative to the state of the VIG unit edge position/deflection when the VIG unit glass sheets 2a, 2b have an identical/the same temperature such as 20° C. It may e.g. be measured by an optical measuring instrument such as a laser distance measuring instrument/sensor.

In one or more other embodiments of the present disclosure, the largest total edge deflection DIS4 of any of the edges 8a-8d of the vacuum insulated glass unit at a temperature difference ΔT=T1−T2 between the two glass sheets 2a, 2b of 65° C. as compared to the vacuum insulated glass unit at a temperature difference ΔT=T1−T2 of 0° C. is at least 2 mm, such as at least 3 mm or at least 4 mm, such as in the range of 2 to 40 mm, such as in the range of 5 to 35 mm, preferably in the range of 8 to 20 mm.

As can be seen, in FIG. 4, the frame opening plane P2 here is determined to be placed to coincide with the VIG unit plane P1 in the frame (the frame is though not illustrated). In some embodiments, the total edge deflection DIS4 will be the sum of the largest distances of positions of the VIG unit edge in question from the frame opening plane P2 in each their direction D1, D2 from that plane. In FIG. 4, the largest total edge deflection DIS4 is defined between the deflection of the edge seal 3 at the centre 5 of the edge 8b, and the edge seal 3 at the corner 9 of the same edge, in a direction perpendicular to the plane P2, P1.

Figure 5:
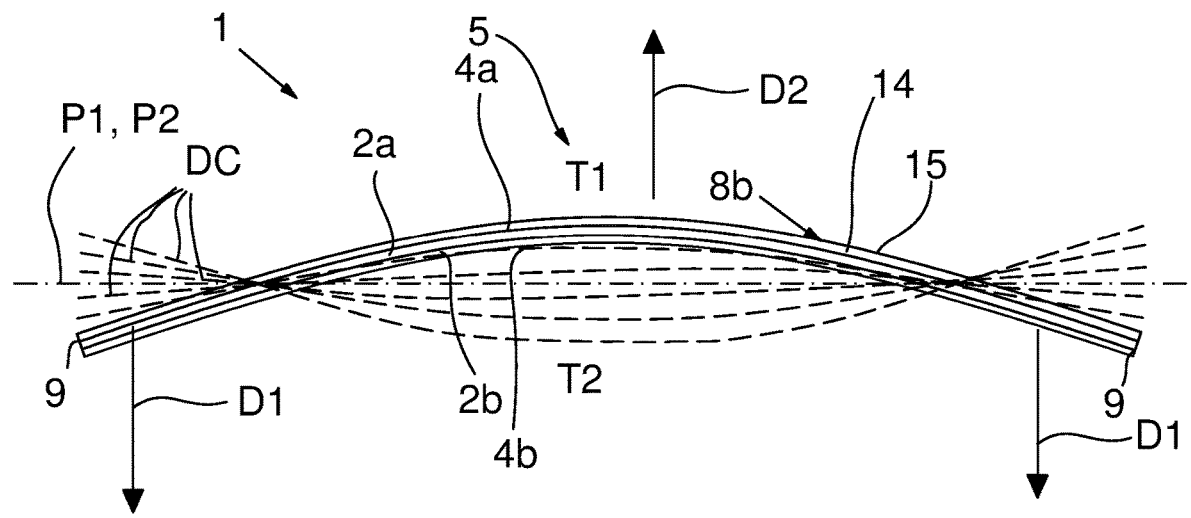

FIG. 5 illustrates an example of a situation where a VIG unit 1 is subjected to a varying temperature difference ΔT=T1−T2 between the glass sheets 2a, 2b over time, according to embodiments of the present disclosure.

For example, it is common for e.g. building aperture covers such as windows or doors arranged in openings of outer walls, roofs or the like of a building, that these are subjected to varying temperature differences over time after they have been installed. Similar temperature differences may also apply to refrigerator and cooler covers or doors.

For example, with a room temperature T1 of e.g. about 20° C. in the building, the temperature T2 at the other side (outside a building) of the VIG unit 1 may vary significantly, such as between e.g. 15° C. and 30° C. or even more, over 24 hours.

Even, the temperature difference ΔT=T1−T2 may so to say switch "operational sign" so that the hotter side of the VIG unit may shift one or more times over e.g. 24 hours, many times over a calendar year, or even in the mere case that a hail, rain or snow shower occurs for a short period of time. This may e.g. largely depend on the geographical area where the VIG unit frame assembly is installed, and causes the rate and even direction of the thermal deflection to change over time.

As an example over 24 hours, the outside temperature T2 may start to be 10° C. at 8 PM, and at 3 AM it may be 35° C., and it then gradually decreases again to 10° C. overnight. The inside temperature T1 is set to e.g. be 20° C. the whole 24 hours.

This causes the temperature difference ΔT to switch operational sign: The temperature T1 is 20° C. at the inside, and T2 (outside) is 10° C. at 8 PM. Thus, the VIG unit edge 8b corners 9 deflect in a first direction D1 as illustrated in FIG. 3. Then the thermal deflection of the VIG unit edge 8b gradually changes (illustrated by dashed deflection curves DC) as the temperature T2 changes to be 35° C. at 3 AM at surface 4b, and thus 15° C. higher than T1. Thus, the VIG unit thermal deflection changes so that the edges 8a-8d deflects in the other direction, and then, it deflects back again as the temperature T2 changes back to the about 10° C. overnight. This may even vary over the year dependent on the time of year, and e.g. in winter time, the outside temperature may be significantly below 0° C., and in the summer time, it may be significantly above 30° C., although the inside room temperature may be desired to be substantially constant, e.g. by help from a room heating system or cooling system (e.g. air-conditioning). These systems may also be known as HVAC (Heating, ventilation, and/or air conditioning).

Accordingly, the thermal deflection of the VIG unit 1 may vary significantly over 24 hours and even more over a longer period such as a calendar year and may depend on different weather conditions. A similar temperature difference may occur when a refrigerator or freezer door is opened or if the cooling device is turned on/off. This causes varying stress condition on the VIG unit over time, such as at the edges 8a-8d near the location where the VIG unit glass sheets are connected to seal the gap by e.g. an edge sealing 3. The stress conditions are complex. Examples of these stresses may be shear stresses at the VIG edge, differential stresses where tensile stress occurs at the deflecting glasses and/or stress concentrations at the corners.

If the VIG unit has a shape and/or size where at least some of the edges of the VIG unit may risk thermally deflecting more than the above mentioned deflection(s), the frame 20 may in embodiments of the present disclosure comprise a restriction arrangement for restricting the thermal deflection of the edge(s) 8a-8d, such as for example the longest edges of the VIG unit or all edges of the VIG unit. This restriction arrangement may comprise a gasket solution, one or more stop parts of the frame preventing an edge deflection above a certain point and/or the like. The edge deflection may e.g. in aspects be restricted between 20 and 90%, such as between 40-70% compared to free, un-constricted thermal deflection of the respective edge.

Figure 6:
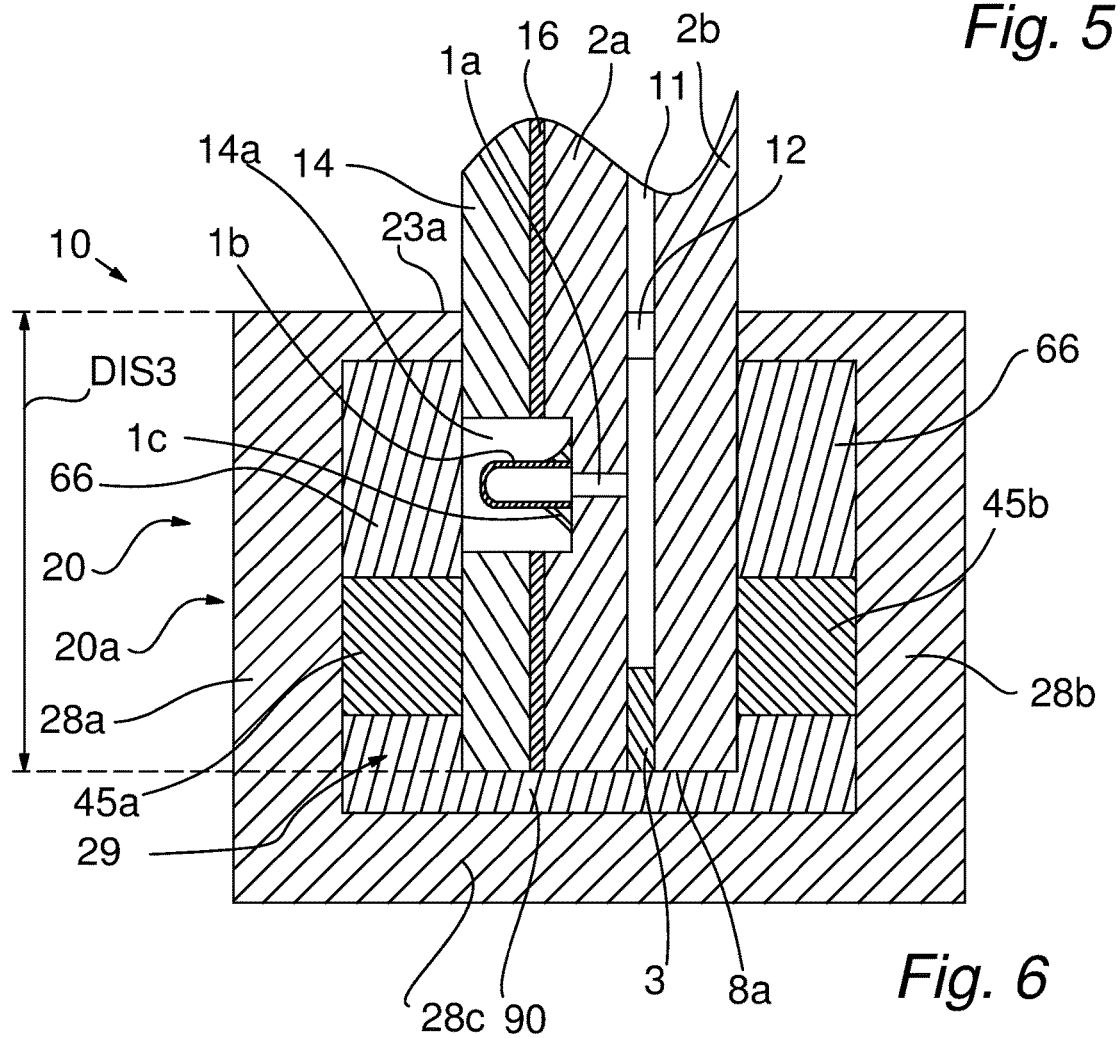

FIG. 6 illustrates schematically a cross sectional view of an elongated frame profile 20a of the VIG unit frame assembly 10 according to embodiments of the present disclosure.

As can be seen, a sealing system 1b, 1c seals an evacuation opening/hole 1a arranged in the VIG unit glass sheet 2a, and the opening 1a extends to the gap 11.

The sealing system 1b, 1c may in embodiments of the present disclosure as illustrated comprise an evacuation tube 1b such as a metal tube or glass tube. This tube 1b is attached to the glass sheet 4a by means of a sealing material 1c such as a glass material, e.g. a solder glass material such as a low temperature melting point solder glass material for sealing the connection between tube 1b and glass sheet 2a.

The glass tube 1b has been used for evacuation of the VIG unit gap 11 between the glass sheets 2a, 2b, prior to sealing the tube 1b. The evacuation may have been performed by an evacuation cup placed to enclose the tube 1b in a chamber of the cup, or the VIG unit may have been placed in a vacuum chamber. The sealing of the tube 1b may have been provided by means of a heater melting the end of the tube distant to the glass sheet 2a, or by means of a pressing operation deforming the tube, dependent on the tube 1b type and material.

As can be seen, the lamination glass 14 comprises a hole 14a in the lamination glass sheet. In the present embodiment it is a through hole 14a but it may also be a blind hole. The hole 14a provides a countersinking function for the sealing system 1b, 1c.

In preferred embodiments of the present disclosure, the sealing system, such as the free tube 1b top distant to the VIG unit gap 11 is placed below the surface 15 of the lamination glass sheet.

It can be seen from FIG. 6 and several of the figures described below, that the edges 8a-8d of the VIG unit 1 in embodiments of the present disclosure may be kept with a distance between the VIG unit edge 8a and an interconnecting wall member 28c of the frame profile 28 (connecting holding members 28a, 28c), thus providing a space 90 between these. Hence, the VIG unit edge 8a may move/slide into or away from this provided space 90 due to differences in CTE between the glass sheets 2a, 2b and the material of the holding part 6 or another part of the frame. Also, or alternatively, the VIG unit edge 8a may move/slide into or away from this provided space 90 as the temperature difference between the VIG surfaces 4a, 4b varies, hence causing a change in the amount and/or direction of the thermal deflection of the VIG unit 1. This distance between the edge 8a and the surface of the wall 8c facing the edge 8a may e.g. be above 2 mm, such as above 4 mm with a temperature difference ΔT of 0° C. It may e.g. be between 2 mm and 10 mm.

As can be seen in FIG. 6, the tube 1b may be placed in a countersunk hole in the VIG unit which encloses the opening 1a, but in other embodiments, the end of the tube proximate the surface 4a may support on the major surface 4a of the VIG unit, this is illustrated in figures described later on.

The edge 8a of the vacuum insulated glass unit 1 proximate the hole 14a in the lamination glass sheet 14, the sealing system 1b, 1c and the hole 14a in the lamination glass sheet 14 into which the sealing system 1b, 1c extends are covered by and enclosed in the frame 20.

The frame comprises elongated holding members 28a, 28b providing an enclosing frame wall and providing a recess 29 receiving the edge 8a.

In embodiments of the present disclosure, the vacuum insulated glass unit 1 is fixed between the holding members 28a, 28b by means of fixation arrangements 45a, 45b arranged between the respective holding member 28a, 28b and an outwardly facing surface 4b, 15 of the vacuum insulated glass unit. The fixation arrangements 45a, 45b may in embodiments of the present disclosure e.g. be provided by clamps (see FIG. 19), they may be resilient suspension elements (made from a rubber material, a plastic material, a foam and (or the like) that are pre-compressed between the VIG unit and the respective holding member and which expands or are less compressed as the thermal deflection of the VIG unit's edge changes, it may be a silicone or plastic material, a glue or a moulded material that is moulded onto the VIG unit 1, an adhesive tape and/or the like.

Generally, the elements 45a, 45b may in embodiments of the present disclosure have a shore A value between 30 and 95. For example, in one or more embodiments of the present disclosure, the suspension elements may have a shore A value between 30 and 90, such as between 30 and 70 or between 45 and 85.

As can be seen in FIG. 6 and other figures described below, the holding members 28a, 28b and the fixation arrangements 45a, 45b provides a fixation of the vacuum insulated glass unit at opposite, outer surfaces 4b, 15 of the laminated vacuum insulated glass unit 1 unit along and opposite to the edge seal 3 of the vacuum insulated glass unit 1 which seals the gap 11 between the VIG unit glass sheets 2a, 2b. A part of the edge seal is thus placed between the holding members 28a, 28b and between the fixation arrangements 45a, 45b.

The holding members 28a, 28b and the fixation arrangements 45a, 45b holds the VIG unit in the frame 20 at the outwardly facing surface 15 of the lamination glass sheet 14 and the surface of the VIG unit 4b respectively. This may be achieved by clamping forces provided by the walls 28a, 28b and/or the fixation arrangements 45a, 45b, one or more adhesive connections between the laminated VIG unit 1 and the fixation arrangements 45a, 45b and/or the like.

As can be seen in FIG. 6, the space 66 between the frame walls 28a, 28b provided by the recess 29 may in embodiments of the present disclosure be filled with an insulating material such as an insulating foam, a polystyrene material, a glass fibre insulation such as glass wool or mineral wool, it may comprise an aerogel insulating material and/or the like, but it may also be kept substantially empty and thus just be filled with a gas such as air.

It is generally understood, that in embodiments of the present disclosure, the frame 20 may overlap the VIG unit edges (in FIG. 6 the VIG edge 8a is illustrated) by a certain amount/distance DIS3. This may help to provide an improved insulation performance of the VIG unit frame assembly 20, as the edge seal 3 material such as a metal material or a solder glass material, for example a low melting point solder glass, may provide a "cold bridge" at the VIG unit edge where it seals the gap 11.

The distance DIS3 may in embodiments of the present disclosure be at least two times the width W1, such as at least three times the width of the edge seal 3, measured along an inner surface facing the gap 11 of one of the VIG glass sheets in a direction perpendicular to the nearby edge 8b. In embodiments of the present disclosure, the distance DIS3 is between two and five times the edge seal width W1.

For example, the overlap DIS3 may in embodiments of the present disclosure be between 10 mm and 50 mm, such as between 20 mm and 40 mm.

The distance DIS3 may be measured along an outer surface 15, 4b from the edge 8b to the position where the frame assembly 20 ends and a view through the VIG unit 1 glass sheets 2a, 2b is possible. In the present example, it may be measured between the edge 8b and the frame surface 23a facing the frame opening 21.

It is understood that in further embodiments of the present disclosure (not illustrated in FIG. 6), the outwardly facing surface of the VIG unit 1 to face away from a temperature controlled room such as a room in a building (or a temperature controlled cavity in a freezer or a refrigerator) may either be less overlapped by the frame than the other surface, such as surface 4a, to face the room. This may e.g. be provided at one or more sides of the VIG unit at e.g. the bottom edge, top edge and/or side edges of the VIG unit.

Figure 7:
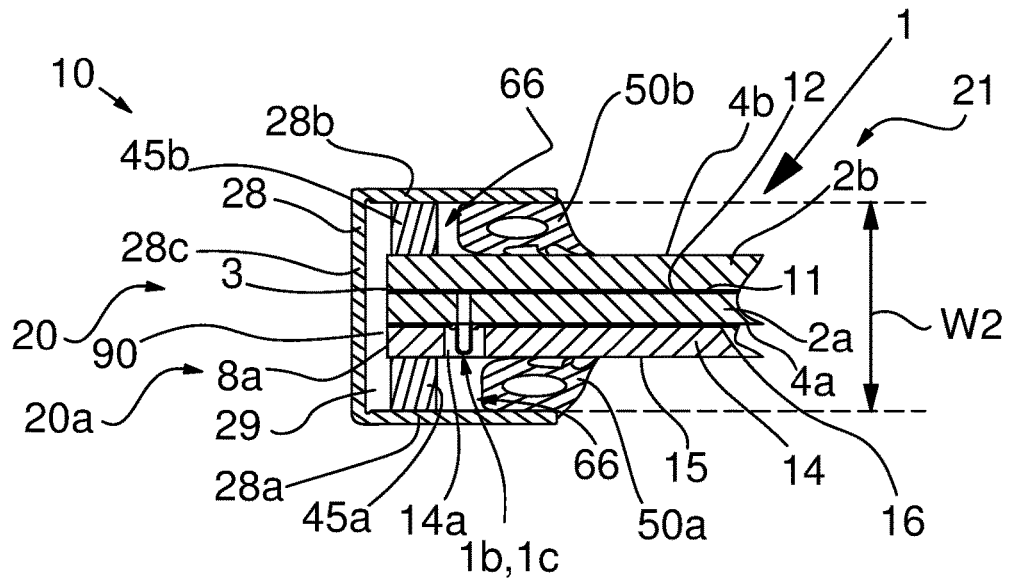

FIG. 7 illustrates an embodiment of the present disclosure, where a U or C-shaped, one-piece profile 28 provides holding members 28 such as legs or walls, and the fixation of the VIG unit between the holding members 28a, 28b is provided by fixation arrangements as e.g. previously explained. A resilient gasket 50a, 50b is placed between the holding members 28a, 28b and the outwardly facing VIG unit surfaces 4b, 15.

The gaskets/sealing arrangements 50a, 50b comprises resilient gasket strips such as rubber (e.g. natural or synthetic rubber) gasket strips that will be more or less compressed in response to the thermal deflection of the VIG unit, and thus keeps a tightening function between the VIG unit surfaces 15, 4b and the frame during the thermal deflection, along the surfaces 15, 4b. These gaskets 50a, 50b seals the spaces 66.

The gaskets/sealing arrangements 50a, 50b and/or the suspension elements may e.g. be made from an EDPM (ethylene propylene diene monomer) rubber a silicone material, and/or a foam rubber such as TPE (thermoplastic elastomer), e.g. santoprene.

The fixation arrangements 45a, 45b here comprises one or more suspension elements 45a, 45b pre-compressed between the holding members 28a, 28b and the respective outwardly facing surface 4b, 15. The compressed, resilient suspension elements 45a, 45b provides a holding force F1, F2 towards the opposite outwardly facing surfaces 4b, 15 of the vacuum insulated glass unit 1 so as to suspend the vacuum insulated glass unit 1 between the first and second holding members 28a, 28b. Hence, each of the compressed, resilient suspension elements 45a, 45b are further compressed or expands in response to the thermal deflection of the edge 8a of the VIG unit 1 due to a temperature difference $\Delta T$ between the two glass sheets 2a, 2b. Hence, the magnitude of the thermal deflection of the respective VIG unit edge may be allowed to change along the edge as e.g. illustrated in FIGS. 3-5, in the frame recess 29.

In one or more embodiments of the present disclosure, the resilient suspension elements 45a, 45b, may have a height of at least 8 mm such as at least 10 mm, for example at least 12 mm in an uncompressed state. The pre-compression of each the suspension elements 45a, 45b may in embodiments of the present disclosure be at least 3 mm such as at least 4 mm, e.g. at least 6 mm at a temperature difference $\Delta T$ between the glass sheets 2a, 2b of 0° C.

In one or more aspects of the present disclosure, the compression and expansion of the resilient suspension elements at the ⅛, such as the 1/10, such as 1/12 of the length of the vacuum insulated glass unit edge nearest a corner where the respective edge terminates, is configured to be larger than the compression and expansion, respectively, of the same resilient suspension elements at a position closer to the centre of the respective edge, at a temperature difference $\Delta T$ between the glass sheets of e.g. 40° C. or 65° C.

In one or more aspects of the present disclosure, said resilient suspension elements 45a, 45b may be foam elements, rubber elements, such as substantially solid rubber elements from a rubber material such as natural rubber and/or synthetic rubber, and/or be made from a plastic material or a silicone material. The elements 45a, 45 may e.g. be made from an EDPM (ethylene propylene diene monomer) rubber a silicone material, and/or a foam rubber such as TPE (thermoplastic elastomer), e.g. santoprene.

Generally, the elements 45a, 45b may in embodiments of the present disclosure have a shore A value between 30 and 95. For example, in one or more embodiments of the present disclosure, the suspension elements may have a shore A value between 30 and 90, such as between 30 and 70 or between 45 and 85.

The width W2 of the recess 29 provided between members 28a, 28b may in embodiments of the present disclosure be configured to substantially not change when the VIG unit edge 8a thermally deflect to describe an edge deflection curve as described above, and thus substantially no variation in the distance/width W2 may occur, for example when the temperature difference $\Delta T$ varies in the range of 5° C. to 65° C., such as from −15° C. to +45° C. The allowed thermal deflection of the edge describing a deflection curve may hence be provided in the spaces 66.

In other embodiments of the present disclosure, the distance/width W2 between the holding members 28a, 28b may, at least at some areas of the holding members 28a, 28b along the edge 8a be configured to be allowed to vary due to the thermal deflection of the VIG unit edge 8a, such as between 0.1% and 10% (or more), e.g. between 0.5% and 8%, such as between 0.1% and 4%, for example between 0.5% and 3% of the width W2 (determined at ΔT=0° C.). This may e.g. apply at least when the temperature difference varies in the range of 0° C. to 65° C., such as from −20° C. to +45° C., or at even larger temperature differences.

The edge 8a of the vacuum insulated glass unit 1 proximate the hole 14a in the lamination glass sheet 14, the sealing system 1b, 1c and the hole 14a in the lamination glass sheet 14 into which the sealing system 1b, 1c extends are covered by and enclosed in the frame 20. More precisely, it is in FIG. 7 covered by the holding member 28a.

A minimum distance may as illustrated in e.g. FIG. 7, in embodiments of the present disclosure, be provided between an outer major surface 4a, 4b of the vacuum insulated glass unit and walls 28a, 28b, of the frame. This minimum distance may provide that the frame is kept is at least 4 mm such at least 5 mm, for example at least 6 mm at a temperature difference (ΔT=T1−T2) between the two glass sheets (2a, 2b) of the vacuum insulated glass unit of substantially 0° C.

In embodiments of the present disclosure, the resilient gasket(s) 50a. 50b may have a thickness above 4 mm, such as above 5 mm, for example above 6 mm at a temperature difference between the VIG unit glass sheets of substantially 0° C. This thickness may in embodiments be between 4 mm and 30 mm, for example between 4 mm and 13 mm, such as between 4 mm and 10 mm, for example between 5 and 10 mm, at a temperature difference between the two glass sheets of the vacuum insulated glass unit of substantially 0° C. The thickness is measured in a direction perpendicular to the outer major surface of the VIG unit. The gasket 50a, 50b may provide a "line of sight" through the VIG unit as illustrated.

Figure 8:
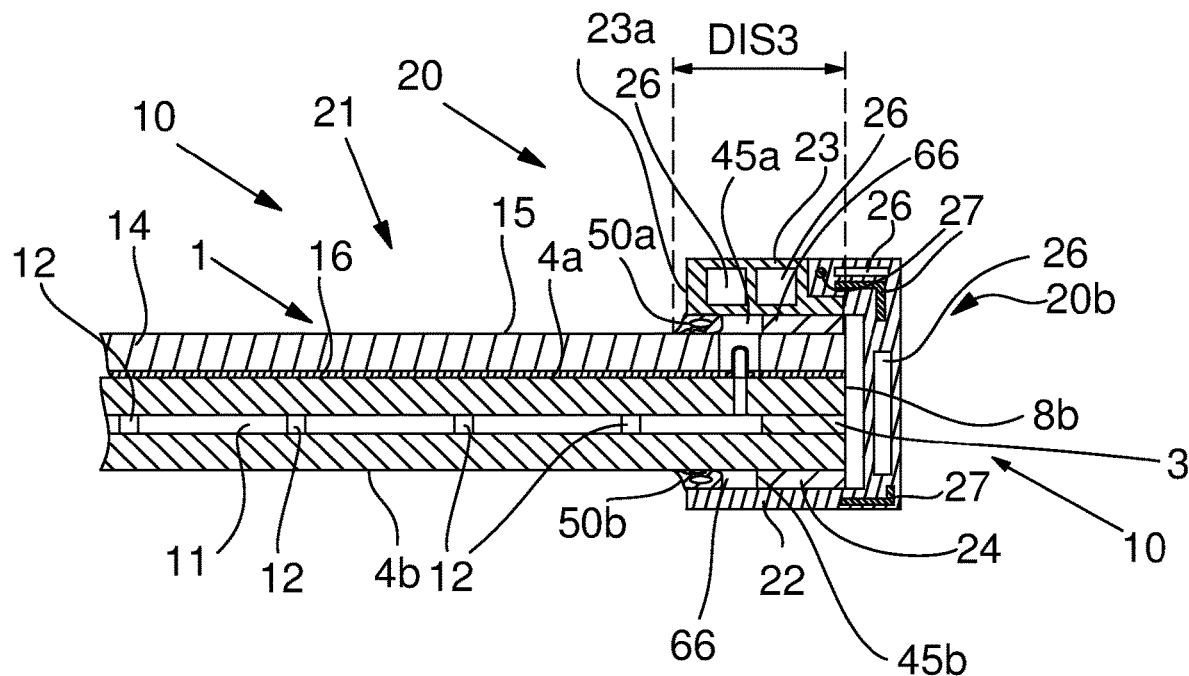

FIG. 8 illustrates schematically a cross sectional view of a VIG unit 1 frame assembly 10 with a base member/glazing member frame solution 20 according to embodiments of the present disclosure.

The elongated frame profile 20b comprises a base member 22 and a glazing member 23. These may be elongated profiles made by means of e.g. an extrusion manufacturing process, a pultrusion manufacturing process, a moulding manufacturing process and/or the like. The material of the profile(s) 22, 23 may e.g., as previously explained be a plastic material such as a PVC (polyvinyl chloride) or PP (polypropylene) plastic material, it may be composite material such as a glass or carbon fibre material, the profiles may be made from a plastic material with fibres embedded to obtain a more strong/rigid profile and/or the like. Also, in one or more embodiments, one or more of the profiles 22, 23 of the frame may be made from a metal such as aluminium, and/or a wood material such as core wood or glued laminated wood material. These profiles may extend continuously between the corners of the frame 20. One frame example can be an aluminium profile with polymer interconnection between the interior and exterior to add a thermal break. Another frame example according to the present disclosure may be a polymer profile with hollow chambers and reinforcements inside the hollow chambers for adequate strength. Another frame example is a compound frame of wood combined with a non-wood profile.

The glazing member 23 and base member 22 together provides a recess 24 into which the VIG unit edge 8b extend, and provides the functionality of the previously explained holding members 28a. 28b described in various embodiments described in relation to one or more embodiments of one or both of FIG. 6 or 7, or described below in relation to further figures.

One or more of the frame profiles/holding members 22, 23 of the frame 20 may in one or more embodiments be substantially solid (not illustrated in FIG. 8). In further embodiments of the present disclosure, the profiles 22, 23 may comprise internal, insulating cavities 26. In FIG. 8, both the glazing member 23 and the base member 22 comprises such cavities 26. These cavities 26 may be obtained during the production of the profiles 22, 23, and may extend in the longitudinal direction of the profile 22, 23 inside the profiles 22, 23.

The cavity or cavities 26 may in embodiments of the present disclosure either be left empty to comprise a gas such as air, or a selected gas pumped into the cavity 26.

Alternatively one or more of the cavities 26 may comprise an insulating material as previously described above in relation to FIG. 6.

The edge 8a of the vacuum insulated glass unit 1 proximate the hole 14a in the lamination glass sheet 14, the sealing system 1b, 1c and the hole 14a in the lamination glass sheet 14 into which the sealing system 1b, 1c extends are covered by and enclosed in the frame 20. More precisely, it is in FIG. 8 covered by the glazing member 23. In FIGS. 7 and 8, the hole 14a in the lamination glass sheet 14 is placed between the gasket/seal 50a and the interconnecting wall 28c, and also between the gasket/seal 50a and the fixation arrangement 45a.

In FIG. 8 the distance DIS3 the edge 3 extends into the frame 20 is measured between the edge 8b and the edge of the gasket 50a distant to the edge 8b.

FIG. 8 moreover illustrates a further embodiment of the present disclosure, wherein the frame profiles 22, 23 comprises strengthening/reinforcing members 27 embedded in the profiles 22, 23, e.g. by means of a co-manufacturing such as co-extrusion or co-pultrusion. These may have any suitable shape, extends in the longitudinal direction of the profiles 20a-29d and helps to improve/increase the rigidity and strength of the frame members 22, 23. The reinforcing members 27 may e.g. be longitudinal metal, composite or plastic rods/profiles extending in the longitudinal direction of the elongated frame profile 20b.

The sealings/gaskets 50a, 50b illustrated in FIG. 8 or other of the figures described above or below may in embodiments of the present disclosure be separate and removable from the frame 20, but in other embodiments of the present disclosure (not illustrated), the sealings/gaskets 50a, 50b may be co-manufactured such as co-extruded or co-pultruded together with the base member 22 and/or the glazing member 23, or the profile 28 as described previously.

As illustrated in FIG. 8, the fixation arrangements 45a, 45b are arranged in the recess 24 between the base member 22 and the glazing member 23, and the outwardly facing VIG unit 1 surfaces 15, 4b.

As can be seen in FIG. 8, the base member 22 may in embodiments of the present disclosure extend from a position opposite to the major surface 4b of the VIG unit 1 and around the edge 8b, and e.g. also to be at least partly opposite to a part of the surface 15 of the lamination glass sheet, but it may also in other embodiments extend only from a major surface 4b of the VIG unit and around the edge 8b, and not extend to the oppositely directed surface 4a of the VIG unit.

Figure 9:
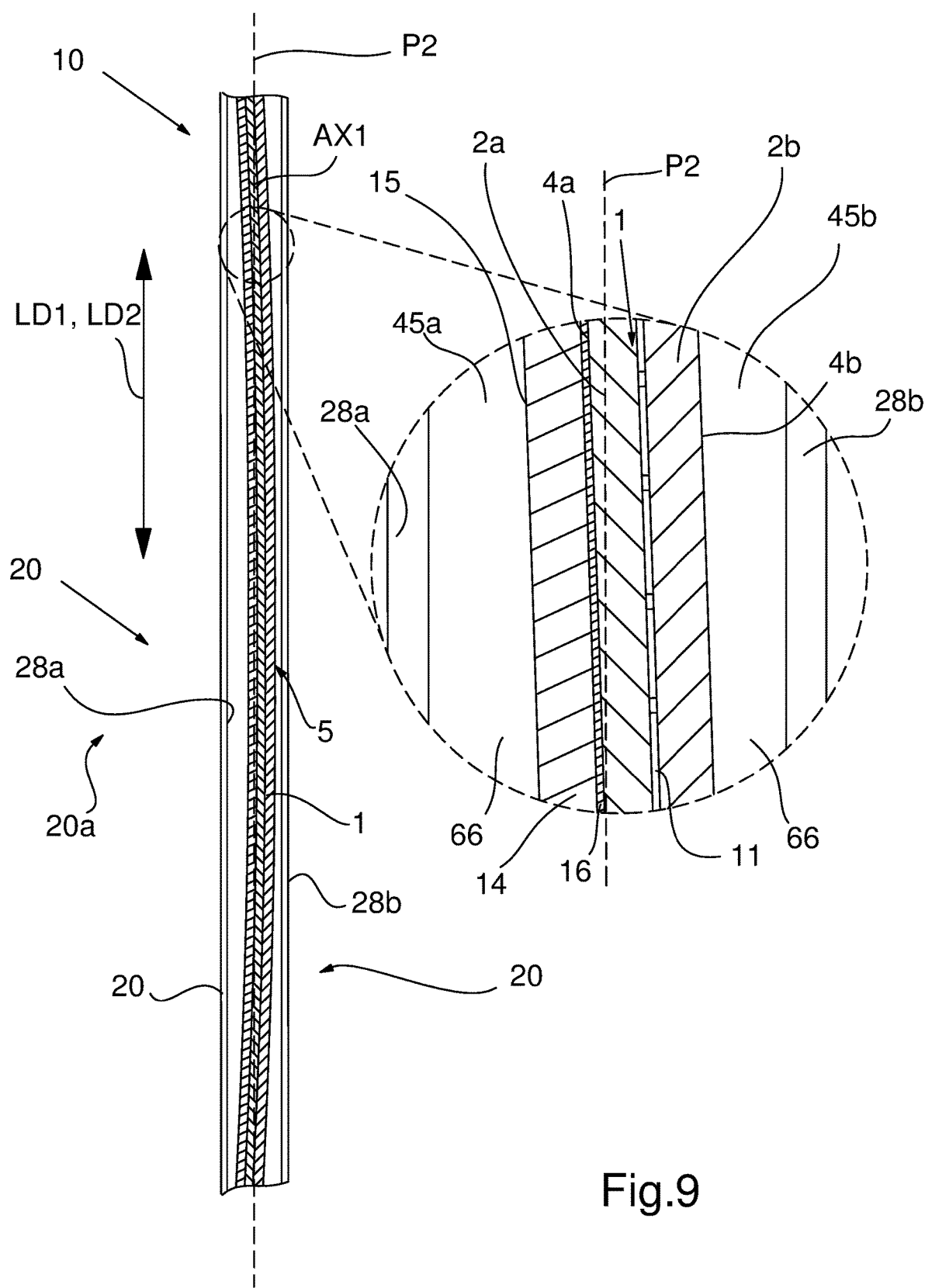

FIG. 9 illustrates a cross sectional view of a VIG unit 1 placed in a frame 20, seen in a direction parallel to the frame opening 21 provided by the frame 20 and towards the elongated frame profile 20a, according to embodiments of the present disclosure.

As can be seen, the VIG unit 1 edge may thermally deflect/bend relative to the holding members 28a, 28b, so that the distance between the outer major surfaces 15, 4b of the VIG unit 1 and the holding members 28a, 28b/near the edge of the VIG unit varies due to a temperature difference between the VIG unit glass sheets 2a, 2b. This causes the fixation arrangements 45a, 45b to expand or be further compressed in the space by the VIG unit due to the thermal deflection along the longitudinal direction LD1, of the holding members 28a, 28b, and the amount of compression of the respective fixation arrangements varies along the direction LD1 corresponding/according to the thermal deflection of the VIG unit edge.

The fixation arrangements 45a, 45b are pre-compressed, elongated gasket strips configured to extend in the longitudinal direction of the edge 8a-8d of the vacuum insulated glass unit 1 extending in between the holding members 28a, 28b. These gasket strips are pre compressed between the VIG unit surfaces 4a, 4b and the respective holding member 28a, 28b, so that they may be further compressed or the compression may be reduced in response to a change in the thermal deflection of the VIG unit. This may provide that the VIG unit is allowed to deflect between the members 28a, 28b, and still, the fixation arrangements 45a, 45b provides a fixation of the VIG unit between the holding members 28a, 28b, and in the case where the fixation arrangements 45a, 45b are elongated gasket strips as illustrated, it may also provide a water and/or air tightening.

Generally, in embodiments of the present disclosure, the compression and expansion of the fixation arrangements 45a, 45b arranged at the ⅛, such as the 1/10, such as 1/12 of the length of the vacuum insulated glass unit edge nearest a corner where the respective edge terminates, may be configured to be larger than the compression and expansion, respectively, of the same resilient suspension elements at a position closer to the centre 5 of the respective edge.

Figure 10:
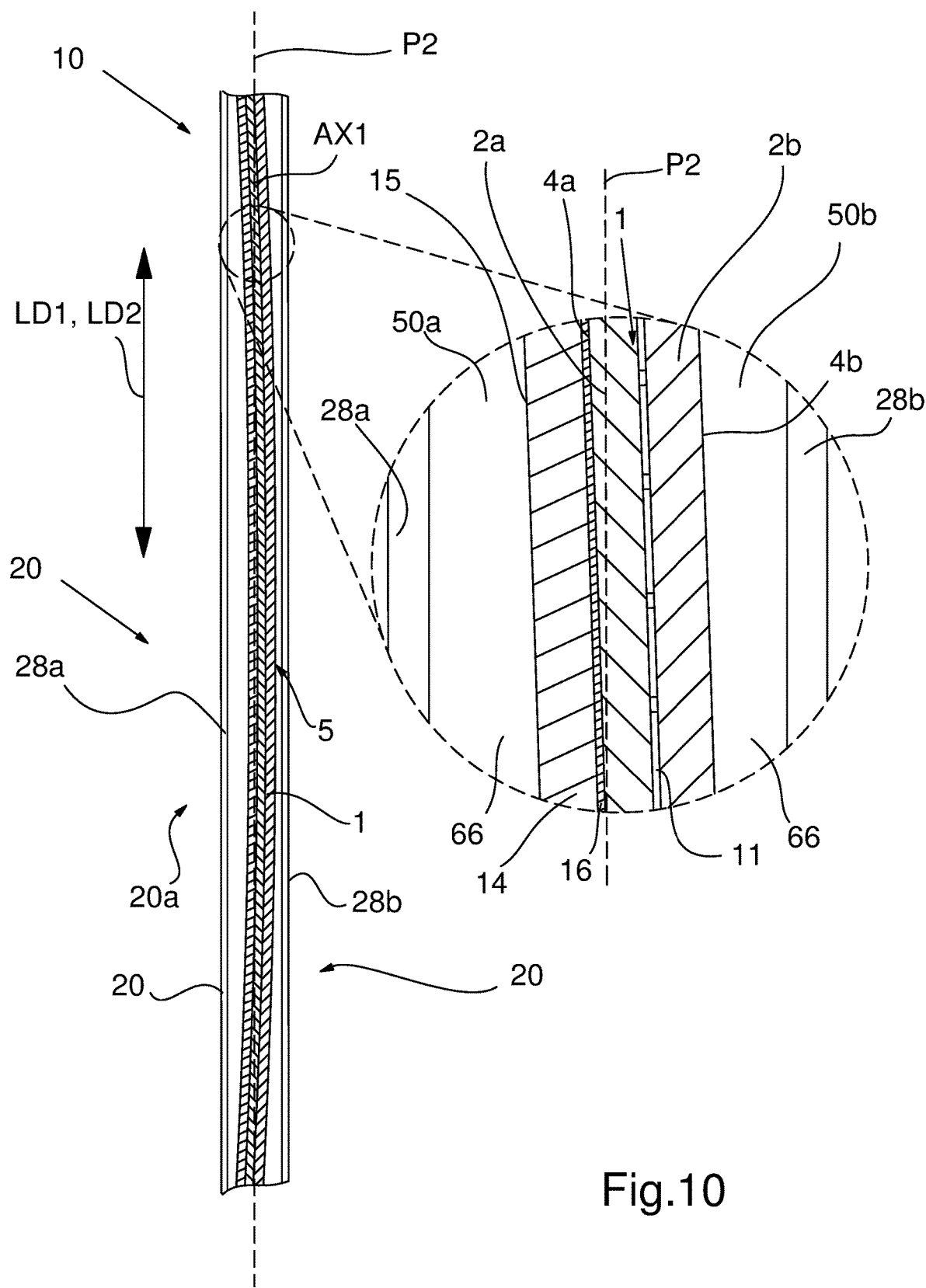

FIG. 10 also illustrates a cross sectional view of a VIG unit 1 placed in a frame 20, seen in a direction parallel to the frame opening 21 provided by the frame 20 and towards the elongated frame profile 20a, according to embodiments of the present disclosure. This figure is substantially similar to FIG. 9, however, it is here the sealings/gaskets 50a, 50b that are more or less compressed or deflected in response to the thermal edge deflection. As can be seen, the VIG unit 1 edge may thermally deflect/bend relative to the holding members 28a, 28b, so that the distance between the outer major surfaces 15, 4b of the VIG unit 1 and the holding members 28a, 28b near the edge of the VIG unit varies due to a temperature difference between the VIG unit glass sheets 2a, 2b. This causes the resilient gaskets/sealings 50a, 50b to expand or be further compressed or deflected by the VIG unit 1 due to the thermal deflection along the longitudinal direction LD1, of the holding members 28a, 28b. The amount of compression or deflection of the respective gasket/seal 50 varies along the direction LD1 corresponding/according to the thermal deflection of the VIG unit edge.

Generally, in embodiments of the present disclosure, the compression/deflection of the gaskets/sealings 50a, 50b arranged at the ⅛, such as the 1/10, such as 1/12 of the length of the vacuum insulated glass unit edge nearest a corner where the respective edge terminates, may be configured to be larger than the compression, respectively, of the same resilient gasket/sealing 50a, 50b at a position closer to the centre 5 of the respective edge.

Figure 11:
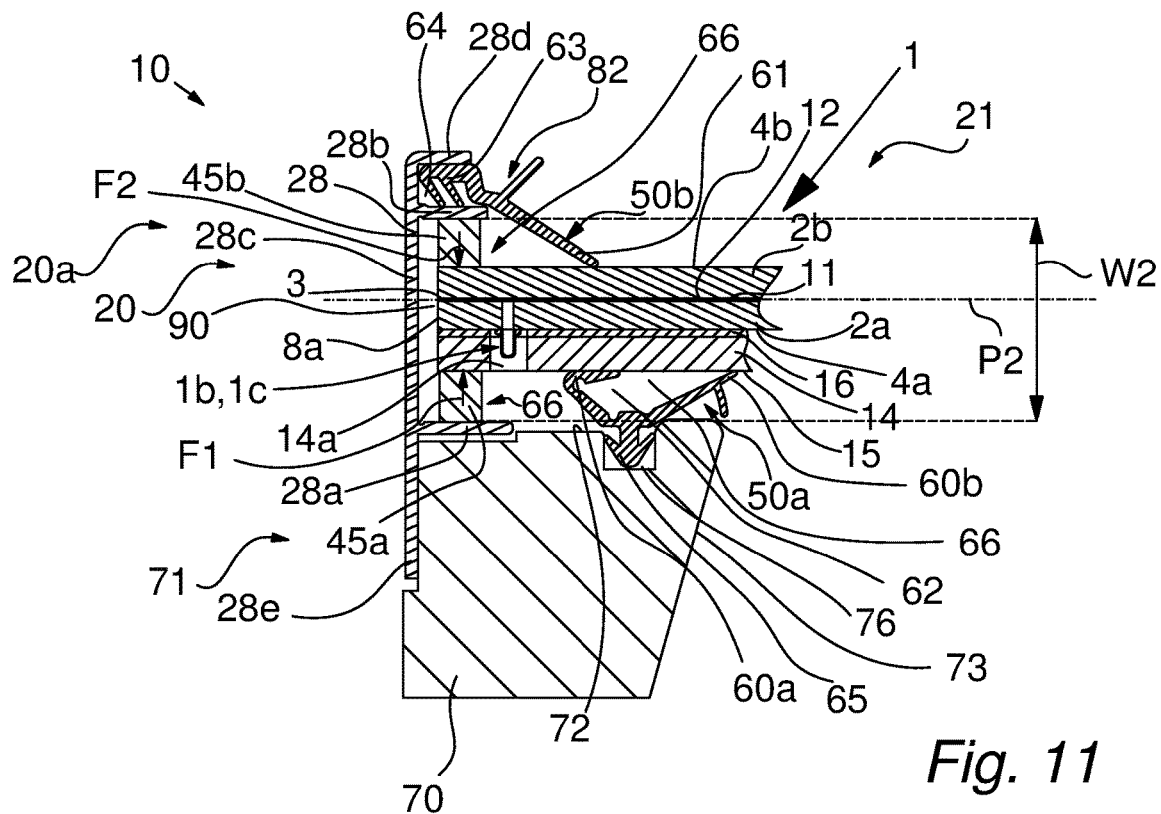

FIG. 11 illustrates schematically a cross sectional view of several embodiments of the present disclosure where the VIG unit frame assembly 10 is a window.

Here the gasket/seal arrangement 50a is placed between a sash profile 70 and the VIG unit surface 15. The gasket arrangement 50a is arranged to provide an air tightening at the surface 4a of the VIG unit 1 for facing the interior of the building, and comprises two elongated flaps/lips 60a, 60b each deflected (and not as such compressed) by the VIG unit surface 4a compared to a free state, and in contact with/abutting the VIG unit surface 4a. These tightening flaps/lips 60a, 60b help to protect against condensation at the VIG unit edge 8a area due to a cold bridge provided between VIG unit glass sheets by the edge sealing 3.

A space 62 defined between the flaps/lips 60a, 60b and enclosed by the VIG unit surface 4a helps to provide an air and/or heat insulation.

The gasket arrangement 50a thus follow the VIG unit edge 8a movement when the VIG unit's thermal deflection changes due to a temperature difference variation, due to the resilient properties of the gasket arrangement 50a, so as to provide an air tightening functionality.

The seal/gasket arrangement 50b is arranged to provide a water tightening at the outer surface 4b of the VIG unit 1 to face away from the interior of the building. This gasket arrangement 50b also comprises an elongated flap/lip 61 deflected by the outer surface 4b of the VIG unit 1. This flap/lip 61 follow the VIG unit movement when the VIG unit's thermal deflection changes due to a temperature difference variation, due to the resilient properties of the gasket arrangement 50b, so as to provide a water tightening functionality, e.g. to protect the interior of the frame such as the space 66 and recess 29 from moist, dew, rain water and/or the like. The gasket arrangement 50b thus follows the difference in the edge deflection curve caused by thermal deflection.

Generally, as one of the lips/flaps of the gasket arrangements 50a, 50b hence become less deflected by the VIG unit as the thermal deflection of the VIG unit changes, the lips/flaps of the other gasket will at the same location of the VIG edge 8a simultaneously become more deflected.

As can be seen, the outer gasket 50b may in embodiments of the present disclosure be connected to the frame 20 by being inserted in a gasket recess 64 of the holding member profile 28 dedicated to this. The recess 76 receives a connection part 63 of the elongated gasket arrangement 61. This gasket recess or groove 64 is defined between the holding member 28b, and a further gasket support member/wall 28d.

The recesses 29 and 64 extends parallel in the longitudinal direction of the frame profile arrangement 20a, along the longitudinal direction of the edge 8a of the VIG unit.

The sash profile 70 may be configured to face the interior of the building. The profile 70 comprises a groove 76 in a surface 72. This groove 71 receives a connection part 65 of the gasket arrangement 50a, so that the gasket arrangement 50a extend between the sash profile surface 72 and the VIG surface 4a. Also or alternatively, the groove 76 may be arranged in another surface 73 dependent on the design of the gasket/seal arrangement 50a.

It is naturally to be understood that in other embodiments of the present disclosure, the gasket arrangements 50a, 50b may be attached/connected to the frame 20 by any other suitable means such as by means of glue, nails, screws or the like and/or be attached/connected to the frame at other location than the ones illustrated and described in relation to FIG. 10.

As illustrated in FIG. 11, the width W2 of the recess 29 between holding members 28a, 28b may be larger than the thickness of the part of the VIG unit edge 8a extending into the recess 29, and hence, a predefined space 66 may be provided between the outer surface 4a, 4b of the glass sheets 2a, 2b of the VIG unit 1, and holding members 28a, 28b.

The VIG unit 1 may as described in relation to FIGS. 9-10 either thermally deflect in this space 66 between the walls 28a, 28b so as to describe the previously described "deflection curve" of the edge 8a in the recess 29, and/or the holding members 28a, 28b may deflect along with it.

In embodiments of the present disclosure, the distance 66 between the holding members 28a, 28b and the respective VIG unit surface 4a, 4b may configured to be larger than 2 mm, such as larger than 4 mm e.g. larger than 6 mm, such as larger than 8 mm when the VIG unit is kept at a constant temperature such as 20° so that the glass sheets of the VIG unit are at the same temperature. In embodiments, the spaces 66 between the respective holding member 28a, 28b and VIG unit surface 4a, 4b may be configured to be between 4 mm and 12 mm, such as between 4 mm and 10 mm, e.g. between 5 mm and 8 m when the VIG unit is kept at a constant temperature such as 20° so that the glass sheets of the VIG unit are at the same temperature.

The gasket flap/lips 60a, 60b, 61 seals this space 66, and may thus comprise a surface facing the exterior of the frame arrangement 20, such as facing the frame opening 21.

Also, FIG. 11 illustrates an embodiment of the present disclosure where the holding members are part of a profile 28 comprising a connection wall part 28e. This part 28e connects the profile 28 to the sash profile 70 at a connection area 71. The connection wall part 28e may be connected (at connection area 71) to the sash profile 70 by means of mechanical fasteners (not illustrated) such as screws or nails, one or more snap connections, one or more tongue and groove connections and/or the like. The connection wall part 28e may also or alternatively be connected to the profile 70 by means of an adhesive. Also, in one or more embodiments, the sash profile 70 to which the connection wall part 28e is connected may be made from a metal such as aluminium, and/or a wood material such as core wood or glued laminated wood. In further embodiments of the present disclosure, the sash profile 70 may be an extruded, pultruded or moulded profile, e.g. made from a plastic material such as a PVC (polyvinyl chloride) or PP (polypropylene) plastic material, it may be composite material such as a glass or carbon fibre material, it may be made from a plastic material with fibres embedded to obtain a more strong/rigid profile and/or the like. The elongated sash profile 70 may either be hollow or it may be solid (e.g. a solid wood material profile).

The sash profile 70 may generally in embodiments of the present disclosure be connected to one or more hinge connections so as to allow the sash profile 70 and thus the remaining part of the frame 20 and the VIG unit 1 to be moved and opened and closed relative to a fixed frame arrangement (not illustrated in FIG. 11).

Also in FIG. 11, the edge 8a of the vacuum insulated glass unit 1 proximate the hole 14a in the lamination glass sheet 14, the sealing system 1b, 1c and the hole 14a in the lamination glass sheet 14 into which the sealing system 1b, 1c extends are covered by and enclosed in the frame 20. The hole 14a in the lamination glass sheet 14 is in the present embodiment arranged to faces the space between the sash profile 70 and the VIG unit surface 15. The hole 14b is placed at a position between the gasket/seal arrangement 50a and the interconnecting wall 28c, and also between the gasket/seal 50a and the fixation arrangement 45a in the present embodiment.

As illustrated in FIG. 11, the holding wall members 28a, 28b and the connection part 28e may together provide an F-shape in embodiments of the present disclosure. The walls/members 28a, 28b, 28d may as illustrated in FIG. 11 together provide an E-shape in embodiments of the present disclosure.

Figure 12:
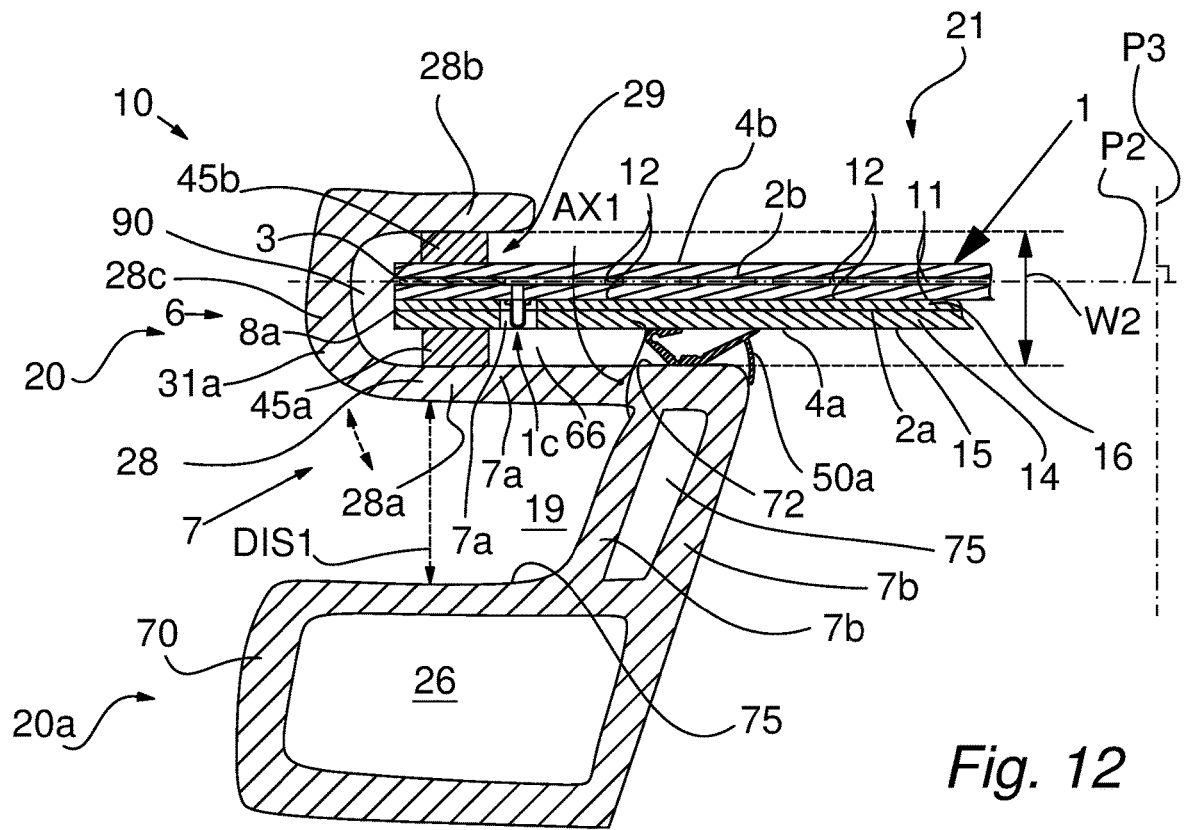

FIG. 12 illustrates schematically a cross sectional view of an elongated frame profile arrangement 20a of a frame 20 according to embodiments of the present disclosure. The elongated frame assembly 20a comprises an elongated sash profile 70 extending in the longitudinal direction of the VIG unit 1.

A holding part 6 fixates the VIG unit 1 in/to the frame 20. The holding part 6 comprises a recessed portion 29 that is provided between the holding members 28a, 28b such as walls or legs. The holding members 28a, 28b are arranged at opposite outwardly facing surfaces 15, 4b of the vacuum insulated glass unit 1, so that the edge 8a of the vacuum insulated glass unit 2 extends into the recessed portion 29 and is held in this recess 29 by means of the holding members 28a, 28b.

A wall part 28c of the holding part 6 interconnects the holding members 28a, 28b and provides a bottom wall member of the recess 29 receiving the vacuum insulated glass unit edge 8a.

A flexible connection arrangement 7 comprising a flexible wall 7a connects the holding part 6 to the elongated frame profile arrangement 20a, in the present embodiment an elongated sash profile 70.

The wall 7a of the flexible connection arrangement 7 is configured to flex (see also FIG. 6b) when the vacuum insulated glass unit 1 exerts a bending moment on the holding part 6 due to a thermal deflection. This bending moment is configured to be provided about an axis AX1 which is substantially parallel to the edge 8a of the VIG unit 1 extending into the recessed portion 29. Hence, the flexible portion of the wall 7a flexes so that the holding part 6 is moved relative (see dashed arrow) to the elongated frame profile arrangement 70, 20a to which the individual holding part 6 is connected.

As can be seen, the VIG unit 1 is held between the holding members 28a, 28b by means of fixation arrangements 45a, 45b of the holding part 6, see e.g. also description above to other figures.

A resilient, elongated tightening gasket or sealing 50a may in embodiments of the present disclosure extend parallel to the edge 8a between a surface 72 of the elongated member 20a and the VIG unit 1 surface 4a. This elongated tightening gasket or sealing 50a is configured to seal the space 66 between the major surface 4a of the vacuum insulated glass unit and the frame 20. This provides a water and/or air tightening between the frame and the vacuum insulated glass unit 1. The gasket/seal 50a may be placed between a fixation arrangement 45a and the frame opening 21.

In FIG. 12, the resilient gasket/seal 50a is placed between the wall(s) 7a of the flexible connection arrangement 7 and the VIG unit 4a surface, and support on the flexible connection arrangement.

Hence, when the thermal deflection of the VIG unit edge changes due to a temperature difference change, the deflection (and/or compression) of the gasket/seal 50a will change, but the gasket/seal 50*a* will, due to the resiliency, still provide an air tightening between the surface 4*a* and the frame 20 in that it will follow the surface 4*a* movement.

Generally, it is understood that the holding part 6 and/or flexible part 7, and e.g. also the elongated sash member 70 may in embodiments of the present disclosure e.g. be made from a plastic material such as a PVC (polyvinyl chloride) or PP (polypropylene) plastic material, it may be composite material such as a glass or carbon fibre material, the profiles may be made from a plastic material with fibres embedded to obtain a more strong/rigid profile and/or the like. Also, in one or more embodiments, one or more of the profiles of the frame may be made from a metal such as aluminium or another suitable metal alloy.

In the example of 12, the flexible connection arrangement 7, the elongated frame/sash member 70 and the holding part 6 is integrated in the same frame profile 28. The profile 28 may either be an extruded, moulded or pultruded, such as co extruded or co pultruded, profile.

Figure 17:
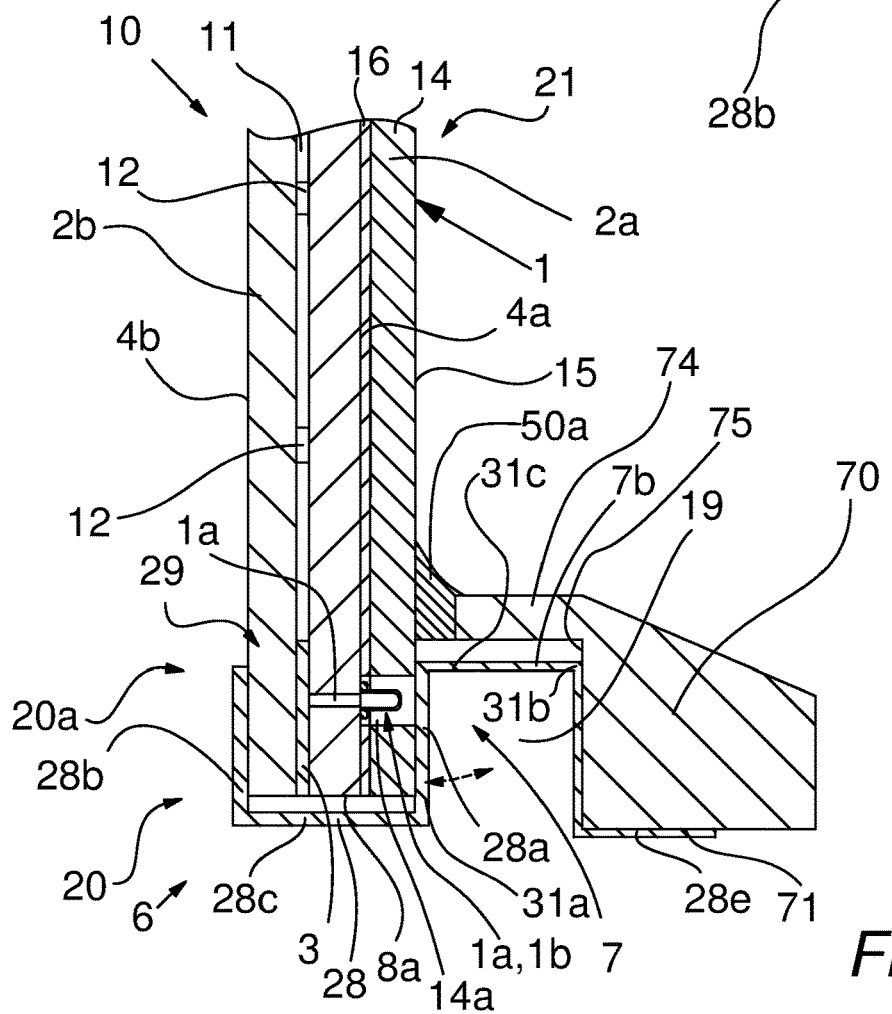

It is understood that in other embodiments of the present disclosure, the profile 28 comprising the flexible connection arrangement 7, and the holding part 6 may be integrated in one profile (e.g. by extrusion, moulding or pultrusion), and may be connected to an elongated sash profile by means of a a sash connection part 28*e*, see FIG. 11 or 17.

The elongated sash profile 70 extending in the longitudinal direction of the VIG unit comprises an insulating cavity 26 enclosed by the sash profile wall. It is understood that the elongated sash profile may comprise a plurality of cavities extending in the longitudinal direction of the profile (substantially along/parallel to the edge 8*a*), and these may be separated by partition walls (not illustrated) obtained during the manufacturing of the profile. One or more these compartments/cavities 26 may in embodiments of the present disclosure be filled with an insulating arrangement (not illustrated) such as an insulating foam, a polystyrene material, a glass fibre insulation such as glass wool or mineral wool, it may comprise an aerogel insulating material and/or the like, but it/they 26 may also be kept substantially empty and thus just be filled with a gas such as air.

The profile 28 comprises distancing walls/portions 7*b* providing the flexing space 19 which the holding part 6 and the wall 7*a* of the flexible connection arrangement 7 can deflect/move into and away from when subjected to a thermal bending. This space 19 is provided between the flexible wall 7*a* and the elongated sash profile 70.

The flexible connection arrangement 7 may thus suspend the vacuum insulated glass unit with a distance from the elongated frame profile arrangement's 70 to which the holding part 6 is connected.

In FIG. 12, two separated distancing walls/portions 7*b* providing an enclosed space there between are provided. This may e.g. help to improve rigidity of the profile in the area of the walls 7*b*, but it is understood that the profile 28 may also just, in other embodiments comprise just one distancing wall/portion 7*b*. The distancing wall or walls 7*b* may in further embodiments of the present disclosure also provide a flexible part of the flexible connection arrangement 7.

As can be seen in FIG. 12, the wall 7*a* of the flexible connection arrangement extends from the holding member 6 and comprises a bend 31*a* towards a plane P3. This plane P3 extends substantially perpendicularly through the frame opening 21 plane P2 and is substantially parallel to the edge 8*a* of the VIG unit extending into the recess 29 of the holding part 6. The bend 31*a* provides that the flexible portion of the wall 7*a* is arranged opposite to the outwardly facing major surface 4*a* of the vacuum insulated glass unit.

The thermal deflection of the edge 8*a* is configured to be provided relative to the frame opening plane P2 towards and away from the sash profile 70.

In embodiments of the present disclosure, the maximum distance DIS1 between the outer surface 75 of the sash profile 70 facing the flexing space 19, and the surface of the holding member 28*a* facing the flexing space 19 (determined substantially perpendicularly to the surface 4*a* and opposite to the edge seal 3) may be between 0.5 cm and 15 cm, such as between 0.5 cm and 15 cm, such as between 0.7 and 7 cm, e.g. between 1 cm and 6 cm.

In embodiments of the present disclosure, the minimum distance DIS1 between the outer surface 75 of the sash profile 70 facing the flexing space 19, and the surface of the holding member 28*a* facing the flexing space 19 (determined substantially perpendicularly to the surface 4*a* and opposite to the edge seal 3) may be at least 0.4 cm, such as at least 0.5 cm, e.g. at least 1 cm, e.g. at least 1.5 mm.

This distance DIS1 may e.g. dependent on the VIG unit size (height and/or width) and/or the layout of the flexible connection system. This distance DIS1 may in embodiments of the present disclosure apply for one or more positions, or along the entire surface 4*a* of the VIG unit when the temperature difference between the glass sheets 2*a*, 2*b* is substantially 0° C.

Also in FIG. 12, the edge 8*a* of the vacuum insulated glass unit 1 proximate the hole 14*a* in the lamination glass sheet 14, the sealing system 1*b*, 1*c* and the hole 14*a* in the lamination glass sheet 14 into which the sealing system 1*b*, 1*c* extends are covered by and enclosed in the frame 20. The hole 14*a* in the lamination glass sheet 14 is in the present embodiment arranged to faces the wall 7*a* of the flexible connection arrangement 7. The hole 14*b* is placed at a position between the gasket/seal arrangement 50*a* and the interconnecting wall 28*c*, and also between the gasket/seal 50*a* and the fixation arrangement 45*a* in the present embodiment.

In further embodiments of the present disclosure (not illustrated in FIG. 12), a separation wall may extend between the sash profile 70 and the VIG unit, between the flexible connection arrangement 7 and the frame opening 21. The resilient gasket 50 may here instead be provided between this separation wall and the proximate major VIG unit surface 15, see e.g. FIG. 17.

FIG. 13 illustrates schematically a cross sectional view according to embodiments of the present disclosure through the holding members 28*a*, 28*b* between the interconnecting wall 8*c* (not visible in FIG. 11) and the edge 8*a*, and is a view towards the edge 8*a* of the VIG unit 1. The edge 8*a* is subjected to thermal deflection, and hence describes a deflection curve. The sash profile and other parts of the frame is omitted from FIG. 11 to improve understanding of the figure. In this embodiment of the present disclosure, the holding members 28*a*, 28*b* of the holding part 6 are configured to follow and deflect together with the deflection of the VIG unit 1 edge 8*a*. The holding members 28*a*, 28*b* of the holding part 6 are thus flexible enough to follow the deflection curve of the edge 8*a*. The fixation arrangements 45*a*, 45*b* may here e.g. be a glue or adhesive tape, it may be gaskets such as rubber gaskets and/or the like. The deflection forces provided by the VUG unit 1 due to thermal deflection may be transferred through these fixation arrangements 45*a* 45*b* to the holding members 28*a*, 28*b*. The VIG unit 1 may here slide relative to the holding members 28*a*, 28*b* when the edge deflection changes.

Thus, in FIG. 13, a certain deflection in the space between the holding members 28a, 28b, may occur in the space 66 (if present) relative to the holding members 28a, 28b, but also, as illustrated, the holding members 28a, 28b may deflect together with the VIG unit due to the thermal deflection of the edge 8a.

FIGS. 14 and 14B-B illustrates schematically a fixation gasket assembly 40 comprising elongated gasket strips 40a-40d for use in a VIG unit frame assembly 10 according to embodiments of the present disclosure to provide the fixation arrangements 45a, 45b. FIG. 14B-B illustrates a cross sectional view of the cutting planes B-B as illustrated in FIG. 13.

As can be seen from FIG. 14B-B, the gasket strips 40a-40d of gasket assembly 40 has/provides a C-profile providing a recess 43 for receiving the VIG unit edges 8a-8d (not illustrated in FIGS. 11). The gasket assembly 40 comprises four elongated gasket strips 40a-40d, one for each VIG edge 8a-8d. Two, or as in the present example three, or four of these gasket members 40a-40d may be folded around the corners of the VIG unit so that the edges of the VIG unit extend into the recess 43 of the C-profile.

The strips 40a-40d may be connected/unbroken at the corners 9 of the VIG unit, and may as illustrated comprise chamfered ends arranged to provide a substantially 90° bend at the corners between adjacent ends of the strips 40a-40d folded at the VIG corners, e.g. so that two adjacent ends of strips 40a-40d arranged at each their edge terminating at the same VIG unit corner 9 abuts.

Figure 15:
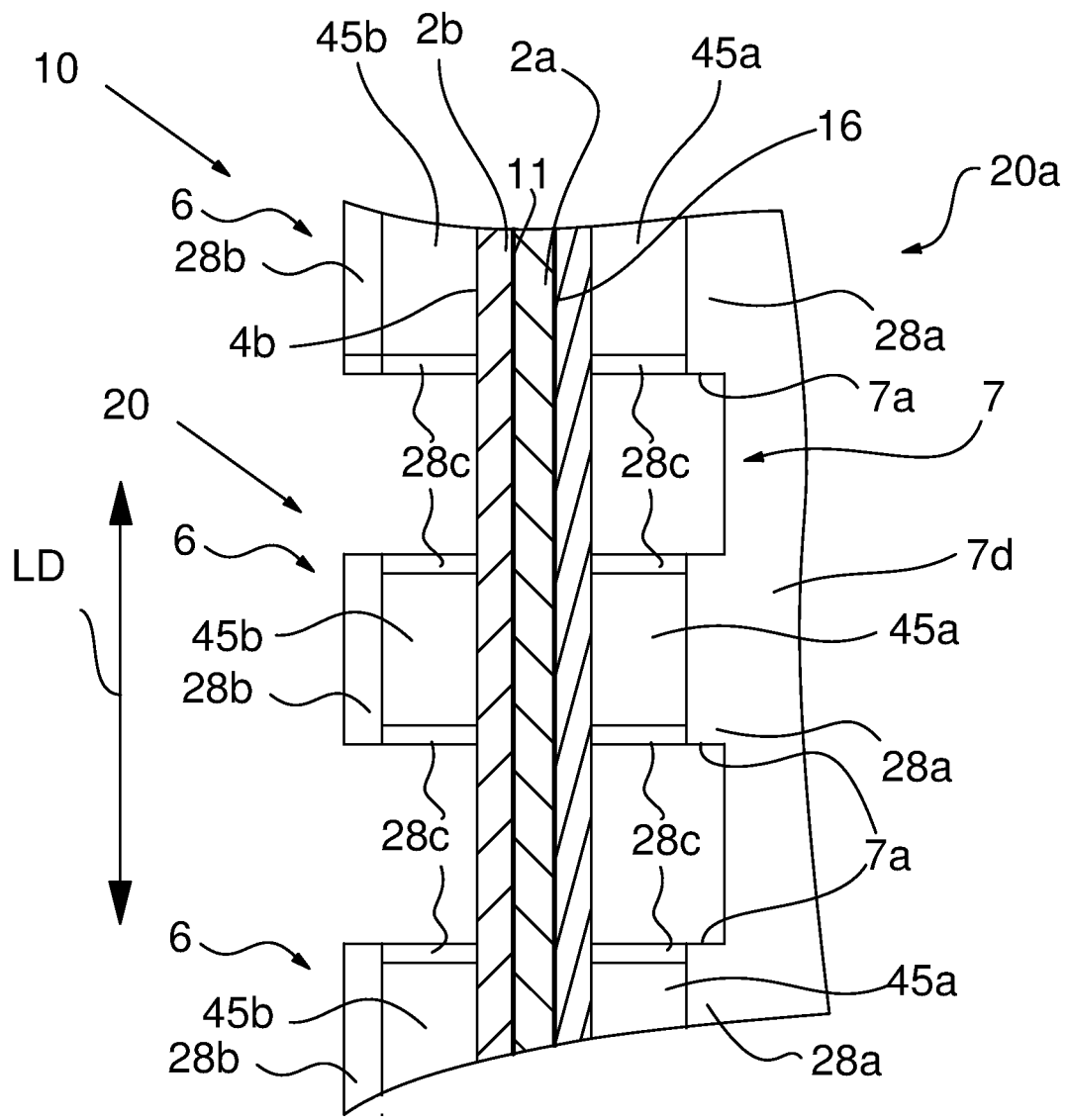

FIG. 15 illustrates schematically embodiments of the present disclosure where a plurality of discrete holding parts 6 each comprising holding members 28a, 28b are distributed in the longitudinal direction LD of the edge 8a-8d of the vacuum insulated glass unit extending into the recess 29 between the holding parts 28a, 28b. Discrete fixation arrangements 45a, 45b extends between the outwardly facing glass sheet surfaces 4a, 4b and the holding members 28a, 28b, and are distributed in the longitudinal direction LD of the edge. This solution may e.g. help to improve flexibility of the holding system for holding the VIG unit in the frame 20, to allow the edges of the VIG unit to thermally deflect.

The interconnecting walls 28c are also in the embodiment of FIG. 14 walls interconnecting the holding members 28a, 28b, and these walls 28c are discretely arranged in the longitudinal direction LD of the VIG unit 1 edge with a space there between. This may e.g. be obtained by individual walls 28c or by providing slits in an elongated wall 28c extending in the longitudinal direction LD of the edge. However, in further embodiments (not illustrated in FIG. 14), the separation wall 28c may be provided by an elongated member extending in the longitudinal direction LD of the VIG unit edge. This wall 28c may interconnects a plurality of discretely arranged holding members 28a, 28b.

It is understood that even though the fixation arrangements 45a, 45b illustrated in FIGS. 14 and 15 are discretely arranged in the longitudinal direction LD of the VIG unit edge, it is generally understood that the fixation arrangements 45a, 45b may also comprise elongated strips extending between the holding members 28a, 28b along and substantially parallel to the VIG unit edge as e.g. illustrated in FIG. 12 or 13.

It is generally understood that in embodiments of the present disclosure, the fixation arrangements 45, 45b may be pre-compressed, resilient suspension elements 45a, 45b providing a holding force towards the opposite outwardly facing surfaces 4a, 4b of the vacuum insulated glass unit 1 so as to suspend the vacuum insulated glass unit between said first and second holding members. Each of said compressed, resilient suspension elements 45a, 45b may thus be configured to be further compressed or expand in response to the thermal deflection of the edge 8a-8d of the VIG unit 1 due to a temperature difference ΔT=T1−T2 between the two glass sheets 2a, 2b. Hence, the VIG unit edge may thermally deflect between the holding members 28a, 28b to describe an edge deflection curve as previously explained. In still further embodiments, the fixation arrangements may substantially not deflect, and the holding members 28a, 28b may instead flex in response to the thermal edge deflection.

In FIG. 15, the holding members 28a, 28b are connected to a flexible connection arrangement 7, see FIG. 12. Though, in further embodiments of the present disclosure, the holding members 28a, 28b and the interconnecting wall 28c may be connected directly to the sash profile 70 (not illustrated in FIG. 14) by means of a sash connection part 28e, see FIG. 11, or they may be moulded/manufactured together with the elongated sash profile 70, seed FIG. 12.

Figure 16:
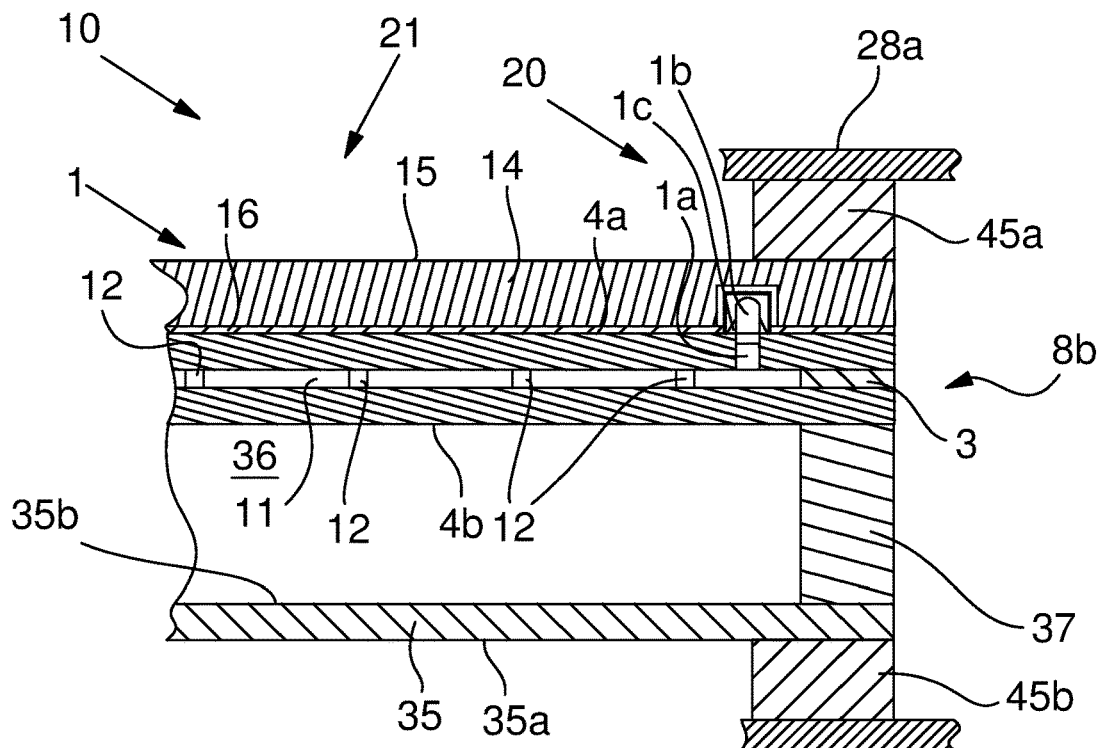

FIG. 16 illustrates an embodiment of the present disclosure where the VIG unit 1 is a so-to-say hybrid VIG unit comprising three glass sheets 2a, 2b, 35 and the lamination glass sheet 14.

This VIG unit 1 comprises glass sheets 2a, 2b paired to provide an evacuated gap 11 between surfaces 4c, 4d, and the gap 11 comprising distributed support structures 12 between these glass sheets 2a, 2b as explained above in relation to e.g. FIG. 2. The hybrid VIG unit 1 moreover comprises a further glass sheet 35 providing a further gap 36 between the major surface 4b of the glass sheet 2b facing away from the evacuated gap 11, and this gap 36 is sealed by means of a gas-space edge seal 37. The VIG glass sheets 35, and 2b respectively thus forms a gas IG (Insulated glass) unit where a gas such as Argon or any other suitable gas may be provide in the space 36 for insulating properties to slow the transfer of heat through the VIG unit.

As can be seen, an evacuation hole 1a in glass sheet 2a is sealed by a sealing system 1b, 1c in the form of a sealed evacuation tube 1b, and a sealing material 1c such as solder glass or metal solder for sealing the connection between tube 1b and glass sheet 2a.

The fixation arrangements 45a, 45b holds the VIG unit 1 between the holding members 28a, 28b at the outer surface 15 of the lamination glass sheet 14 and the outer surface 35a of the glass sheet providing an inner major surface 35b to the gas-filled space 36.

Generally, a coating, for example low-e coating (not illustrated), may in embodiments of the present disclosure be placed at one or more of surfaces 4c, 4d, 4b and/or 35b.

It is noted that even though parts of the frame 20 assembly have been omitted from FIG. 15 for simplicity, a frame solution as described in relation to any of the previous figures may be used in one or more aspects of the present disclosure.

As previously described, the sealing system 1b, 1c extends into the hole/recess 14b in the lamination glass sheet 14, and is hence protected by the lamination glass sheet.

FIG. 17 illustrates schematically a cross sectional view of an embodiment of the present disclosure where substantially no fixation arrangements 45a, 45b such as a rubber gasket, suspension elements or the like is/are placed between the VIG unit surfaces 4a, 4b and the holding members 28a, 28b of the holding part 6. Instead, the edge 8a extends into the recess 29 and is clamped or merely held between the holding members 28a, 28b. As can be seen this may be provided in a solution where the frame comprises a flexible connection arrangement 7 (see e.g. description above to FIG. 12, and FIG. 12), but it may also in further embodiments of the present disclosure be provided where this flexible connection arrangement is omitted, see e.g. FIGS. 7-8 and 11.

In further embodiments, a fixation arrangement 45a, 45b such as a glue layer or an adhesive tape may attach the VIG unit to one or both of the holding members 28a, 28b. a space between the holding members 28a, 28b and the respective outer surface 15, 4b proximate the respective holding member may in embodiments of the present disclosure here be less than e.g. 5 mm such as less than 4 mm, e.g. less than 2 mm.

FIG. 17 moreover illustrates an embodiment of the present disclosure where a separation wall 74 is placed between the sash profile 70 and the VIG unit 1, and is placed between the flexible connection arrangement 7 and the frame opening 21. A resilient gasket 50a is here provided between this separation wall and the proximate major VIG unit surface 15.

The edge 8a of the vacuum insulated glass unit 1 proximate the hole 14a in the lamination glass sheet 14, the sealing system 1b, 1c and the hole 14a in the lamination glass sheet 14 into which the sealing system 1b, 1c extends are covered by and enclosed in the frame 20. More precisely, it is in FIG. 8 covered by the glazing member 23. In FIGS. 7 and 8, the hole 14a in the lamination glass sheet 14 is placed between the gasket/seal 50a and the interconnecting wall 28c, and also between the gasket/seal 50a and the fixation arrangement 45a.

It is generally to be understood that in embodiments of the present disclosure where the edge 8a of the vacuum insulated glass unit 1 proximate the hole 14a in the lamination glass sheet 14, the sealing system 1b, 1c and the hole 14a in the lamination glass sheet 14 into which the sealing system 1b, 1c extends are covered by and enclosed in the frame 20 may be provided by either a new VIG unit frame assembly comprising a VIG unit and a frame, or a retro fitting solution providing this solution.

Figure 18:
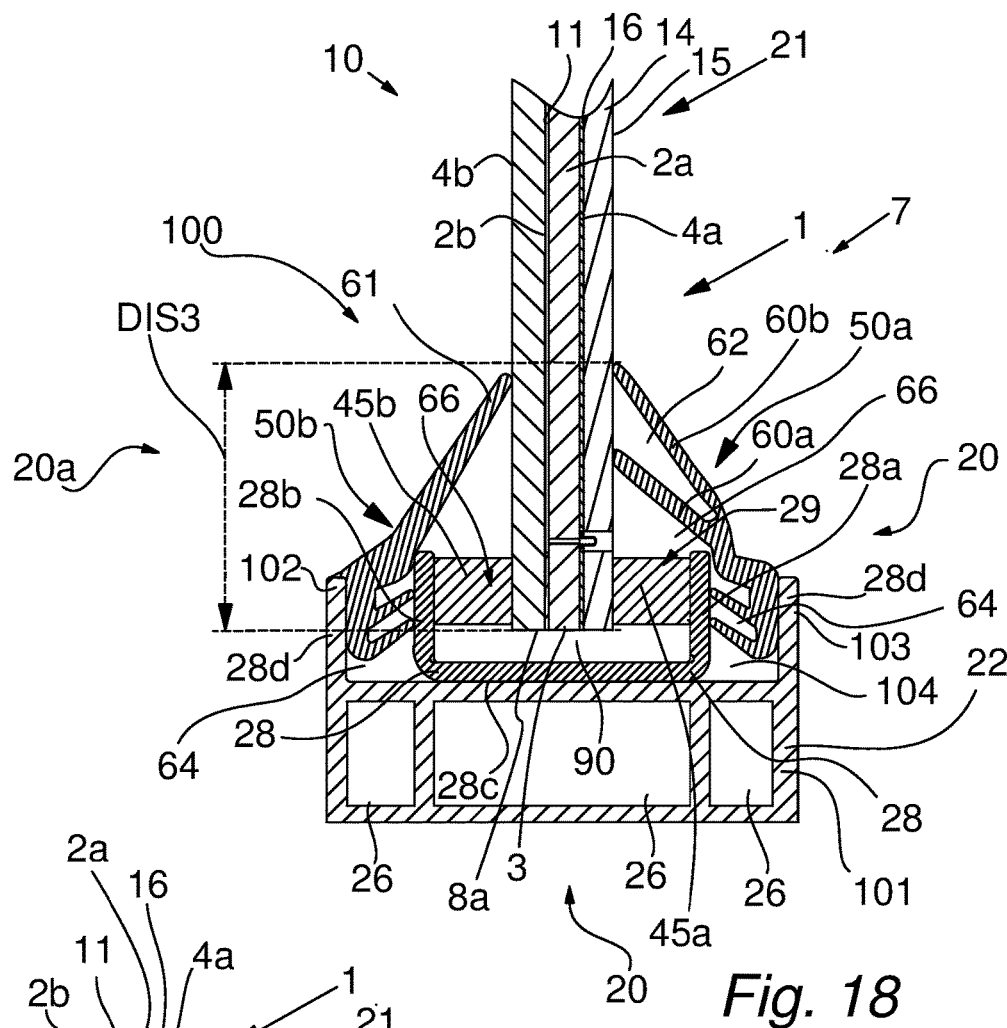

FIG. 18 illustrates schematically a cross sectional view of a retro-fitting solution 100 according to embodiments of the present disclosure for retrofitting a vacuum insulated glass unit 1 to a frame 101 originally designed for gas insulated glass panes of larger thickness than the vacuum insulated glass unit. The frame 101 may either be a frame provided at a frame part manufacturing site, or may be an existing frame where the gas filled and thicker glass pane is replaced.

The retro fitting solution 100 comprises resilient, elongated tightening seals or gasket arrangements 50a, 50b, 60a, 60b, 61 as described in relation to one or more of the embodiments described in relation to one or more of the figures above.

The retro fitting solution 100 moreover comprises fixation arrangements such as e.g. suspension elements 45a, 45b as e.g. previously disclosed, e.g. in form of a plurality of discrete suspension elements or in the form of gasket strips. But the fixation arrangement may also be an adhesive tape, a silicone layer and/or the like.

In the example of FIG. 18, the gasket parts/lips 60, 61a, 61b are configured to deflect to follow a deflection of the vacuum insulated glass unit edge when it thermally deflect and describes the bending curve as described above, to provide a substantially watertight and/or airtight tightening of a space 66 between the one or more frame profiles 28a, 28b and the outer surfaces 4a, 4b of the vacuum insulated glass unit 1 when installed at the frame 101.

The frame 101 comprises a recess 104 provided between two walls 102, 103 of the frame 101.

A profile member 28 of the retro-fitting system 100 provides an U-shape between the holding members 28a, 28b, and is placed in this recess/slit 104 and is fixated to the frame 101 for example by means of mechanical fasteners such as screws, fixation clips, a snap connection or the like, by means of an adhesive or by means of a wedging force (not illustrated in FIG. 18).

The edge 8a of the VIG unit 1 extends into the recess 29 provided by the U-shape of the profile 28 of the retro fitting system 100. The compressed, resilient suspension elements 45a, 45b as previously described in relation to various embodiments of the present disclosure is/are placed in the recess 29 so as to fixate and suspend the vacuum insulated glass unit 2 between the holding members 28a, 28b.

Gaskets 50a, 50b are placed between the walls 102, 103 of the frame 101 and the elongated profile members 28a, 28b of the profile 28, and comprises resilient elongated lips/flaps 60a, 60b, 61 extending to the VIG unit surfaces 4a, 4b. The lip 61 may be configured to provide a water tightening so as to reduce or prevent e.g. rain water from entering the mentioned recesses 28 in the profile 28 attached to the existing frame 101. The lips 60a, 60b may help to provide an air tightening.

In FIG. 18, the profile walls 102, 103 of the frame 101 are an integrated part of a frame profile but one or more of the walls 102, 103 may also be separate members, for example provided by means of a glazing member and base member as e.g. described above.

As can be seen, the profile 28 after installation provides three parallel recesses in the existing frame 101 after it has been installed, i.e. the recesses 64 between the wall 102, 103 of the exiting frame and the walls 28a, 28b of the profile 28, and the recess 29 provided between the walls 28a-28b. These recesses extend in the longitudinal direction of the profiles 28, 101 and thus also in the longitudinal direction of the VIG 1 edge 8a. The recesses 64 are in the present example used for attachment of gasket arrangements 50a, 50b, but one or both of the recesses 64 may alternatively in further aspects of the present disclosure also be used for attachment of a glazing profile 23, e.g. to provide a glazing profile solution as disclosed in e.g. one or more of FIGS. 16, 17 at one or both sides of the VIG unit.

Figure 19:
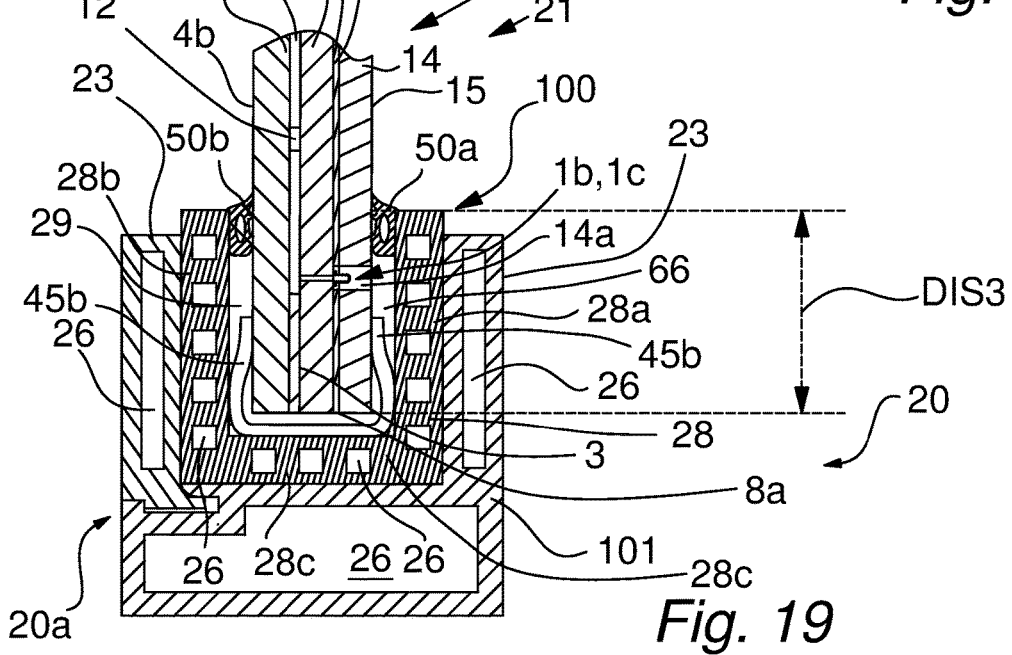

FIG. 19 illustrates schematically a cross sectional view of a retro-fitting solution 100 according to further embodiments of the present disclosure, for retrofitting a vacuum insulated glass unit 1 to a frame 101 which may originally be designed for insulated glass panes of larger thickness than the vacuum insulated glass unit.

The frame 101 may e.g. either be a frame provided at a frame part manufacturing site, or may be an existing frame where the gas filled and thicker glass pane is replaced.

Also in this embodiment, as in FIG. 18, a U-shape in a profile 28 is provided. This profile 28 may as illustrated in one or more embodiments comprise one or more insulating cavities 26, embedded in one or more of the profile 28 walls 28a, 28b, 28c. These 26 may e.g. have been provided during moulding, pultrusion or extrusion of the profile 28, and may comprise insulating material e.g. previously explained or be kept empty. However, in other embodiments, one, more or all of these walls 28a-28c may also be substantially massive.

It is generally to be understood that the insulating properties provided by the retro fitting system at the side of the VIG unit to face the exterior of the building in embodiments of the present disclosure may be configured to be lower than at that side to face the interior of the building.

The frame 101 is of the type comprising a releasable elongated glazing member profile 23 that is configured to connect to the elongated base member 22. See also FIG. 8 and the description thereto.

The glazing member 23 may thus be removed and the retro fitting system 100 is placed. The original glazing member 23 may in embodiments of the present disclosure be either attached to the base member 22 again, it may be discarded, or it may be replaced with another glazing member that is configured to increase or decrease the width of the recess provided between the glazing member 23 and base member 22 walls forming the recess 104, dependent on the size or constitution of the retro fitting system such as the width of the profile 28.

As can be seen, the retro fitting system may be provided so that the gasket arrangements 50a, 50b facing the frame opening and/or the fixation arrangements 6 is/are already installed in the retro fitting system 100 so as to be directly installed at the existing frame. Accordingly, the recess 29 in the profile 28 comprises the fixation arrangements at the points 7, and the seal 40 is placed in the recess 29. Additionally, the gaskets 50a, 50b are placed to provide air and/or water tightening.

As illustrated, the retro fitting system/kit may be configured to provide that the distance DIS3 the frame extend in over/overlap the VIG unit glass sheet surface(s) with a predefined amount, see e.g. more about this in relation to the description of FIG. 7a. The Overlap D1 may e.g. be at least 20 mm such as 25 mm or more, such as between 20 mm and 50 mm measured from the edge 8a and to the free edge/surface of the frame facing the frame opening.

The sealing system 1b, 1c for sealing the evacuation opening/hole 1a is also here covered by the frame.

FIG. 19 illustrates a further embodiment of the present disclosure, wherein the VIG unit is held on/in the frame by means of clamps 80 (only one clamp 80 is illustrated in FIG. 17) discretely arranged along the edge 8a. The clamps 80 are placed in the frame recess 29 and comprises clamping members providing the fixation arrangements 45a, 45b and providing a clamping/holding of the VIG unit 1 at opposite surfaces 15, 4b of the VIG unit. The VIG unit edge 8a is configured to thermally deflect between the positions of the clamps.

It is generally to be understood that in various embodiments of the present disclosure, one or more of the VIG unit's 1 major surfaces 4a, 4b, 4c, 4d, 15 and/or 35a, 35b as e.g. described above may be provided by one or more layers or coatings providing advantages/features improving or providing optical properties (such as tinted/tinting effects, frosting effects, colouring effects and/or the like), mechanical protection advantages and/or advantages with regard to improving (lowering) the $U_g$-value of the VIG unit (e.g. by means of one or more low-e coatings).

Figure 20:
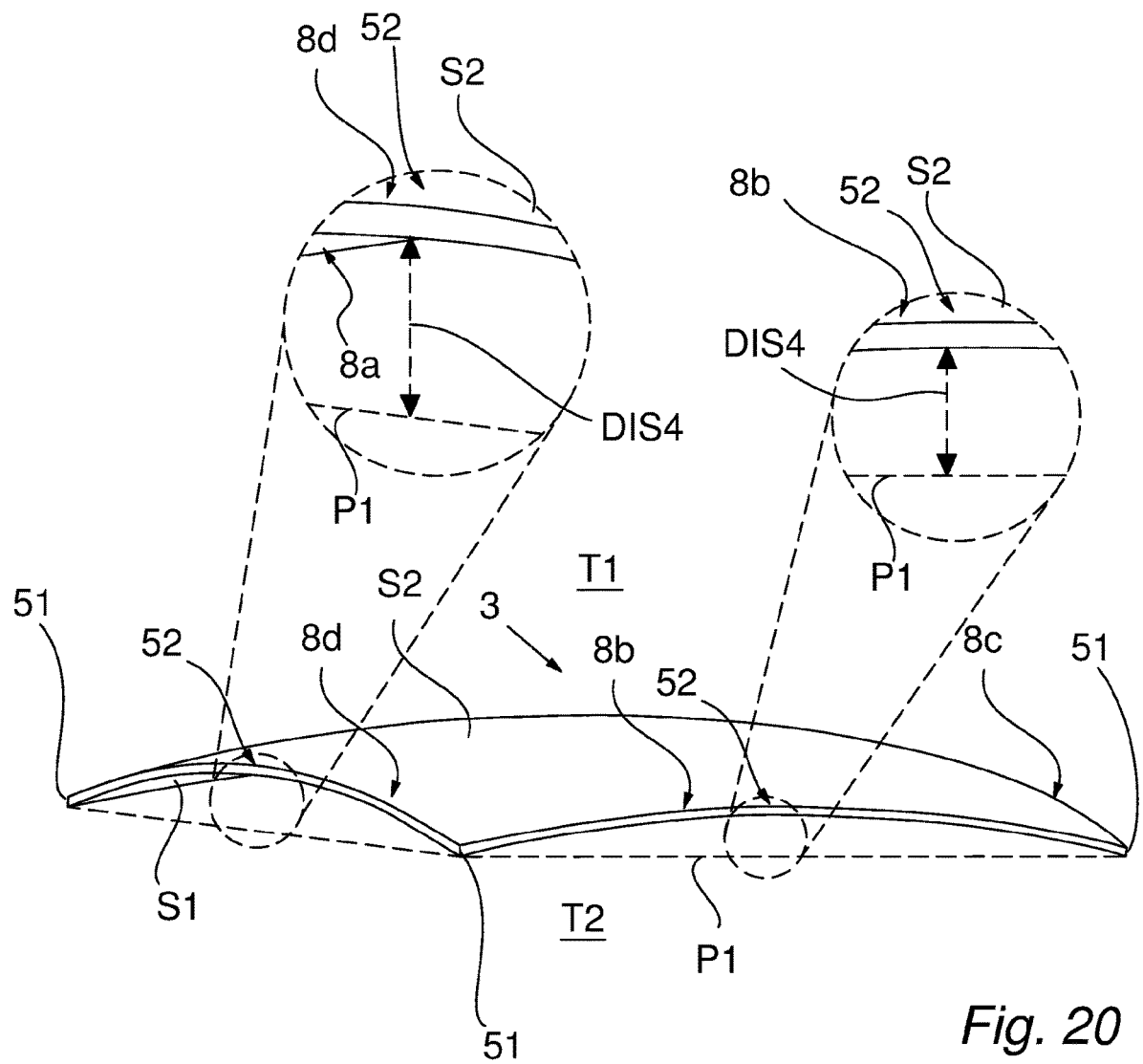

FIG. 20 illustrates a visualized computer simulation of a "free" thermal deflection of a VIG unit 1 used for a frame as disclosed according to embodiments of the present disclosure, which has been provided by one of the present inventors. The VIG unit 1 simulated was based on a VIG unit model defined to have the following characteristics:

The VIG unit is laminated and hence comprises a lamination glass and a lamination interlayer
Length L1 of shorter edges 8d, 8c: 114 cm
Length of the longer edges: 8a, 8b: 140 cm
Glass sheets 2a, 2b type: Thermally tempered glass sheets each having a thickness of 4 mm.
Lamination glass: annealed float glass of a thickness of 4 mm Edge seal material: solder glass edge seal material
The VIG is arranged with the surfaces S1, S2 horizontally and is thus simulated so that gravity acts on the VIG unit.
Temperature difference between T1 and T2: about 60° C.
The hotter side (S2) was set to be the lamination glass side and hence the lamination glass sheet provides the outer major surface S2 in FIG. 20.

For the computer simulation model, a temperature difference/gradient profile was established in accordance with temperatures measured across the hotter/heated side. This profile was based on temperature measurements provided during the test described below. This profile was used in the simulation model for the hotter side. The lamination interlayer was a PVB material.

Under these conditions, the simulation results defined that the distance DIS4 from the centre part 52 of the longer edge 8b would be 7.82 mm from the plane P1 (DIS4). Moreover, under these conditions, the simulation results defined that the distance DIS4 from the centre part 52 of the shorter edge 8d would be 5.15 mm from the plane P1.

Figure 21:
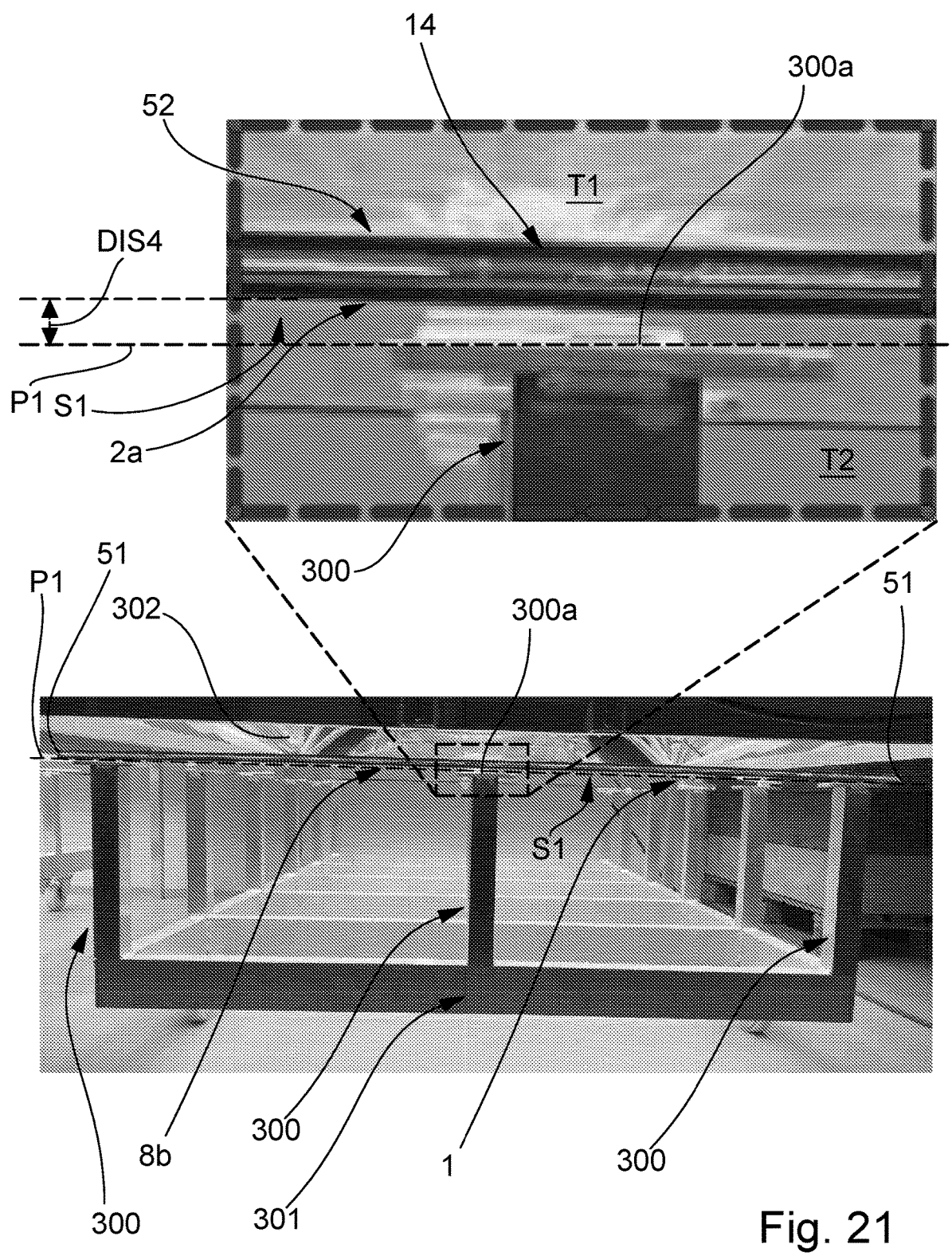
Figure 22:
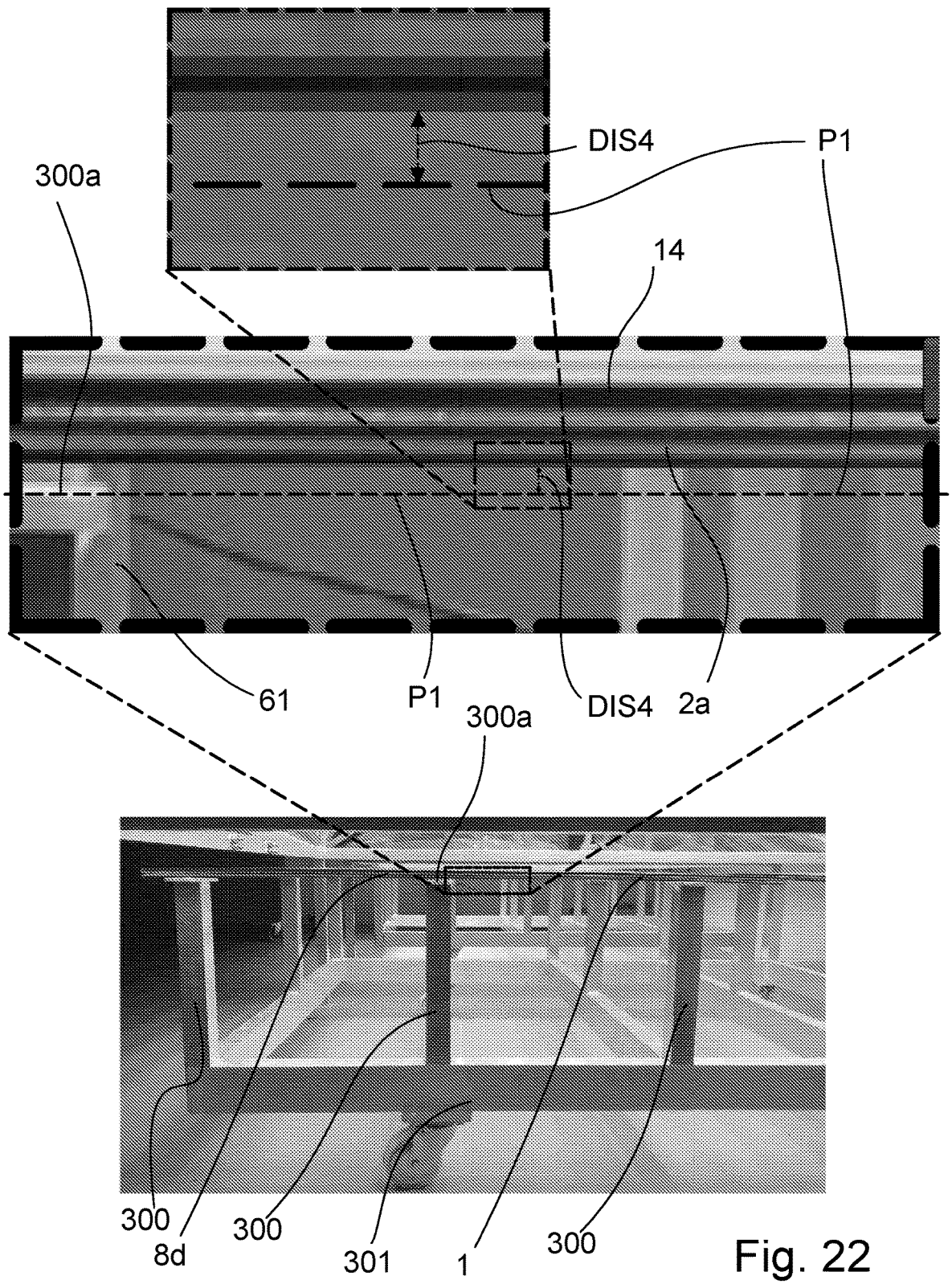

FIGS. 21 and 22 are images of a test of a thermal deflection of a laminated VIG unit 1 having substantially the parameters as defined above with regard to FIG. 20. The VIG unit 1 was placed horizontally to support on support surfaces 300a of a plurality of support rods 300 of a support frame 301. The VIG unit 1 supported initially, when the temperature difference $\Delta T=T1-T2$ was substantially 0° C., on substantially all support surfaces of the frame 301 on which the VIG unit was arranged.

An infrared heat radiation arrangement 302 was arranged above the upper glass sheet, i.e. the lamination glass sheet, and covered the upper glass sheet to a bit beyond the side edge surfaces of the VIG unit 1. Then the heating arrangement 302 started to heat the upper glass sheet 14 of the VIG unit 3, so that the upper glass sheet reached a maximum temperature of approx. 100° C., and the lower glass was measured to have a temperature of approximately 35° C. It was expected and validated that the temperature of the heated glass facing the radiation heater varied over the surface due to cold bridges caused by among others the edge seal of the VIG unit. Hence, no completely uniform heating was obtained (as opposed to the simulation results), but the maximum temperature measured at the heated glass sheet was about 100° C., and for the majority of the heated surface, the temperature was determined to be above at least 85° C. and at many locations above 90° C.

The present inventors could after the heating by the infrared heating arrangement visually see and confirm a formation of an edge deflection curve DC between the VIG unit corners 51. This provided a maximum edge deflection DIS4 of the VIG unit due to the forced temperature difference $\Delta T=T1-T2$, when compared to the temperature difference $\Delta T=T1-T2$ of substantially 0° C. The distance DIS4 was determined by a first reference point defined by a support surface 300a (that was used as a reference for the plane P1), and the lower surface of the VIG unit 1, in a direction substantially perpendicular to the plane P1.

The maximum edge deflection DIS4 of the long edge 8b (FIG. 21) was measured to be approximately 7.4 mm, or more precisely 7.43 mm at the forced temperature difference, when compared to the temperature difference $\Delta T=T1-T2$ of substantially 0° C.

FIG. 22 illustrates the edge deflection of the shorter edge 8d of the same VIG unit as tested in FIG. 21. Here, in a similar way, the shorter edge 8d described an edge deflection curve DC due to the forced heating and the temperature difference between T1 and T2. Additionally, the maximum edge deflection DIS4 of the shorter edge 8d was measured to be approximately 5.3 mm, or more precisely 5.33 mm, at the forced temperature difference, when compared to the temperature difference ΔT=T1−T2 of substantially 0° C.

Accordingly the maximum tested edge deflection DIS4 vs the simulated edge deflection resulted in the values of table 1 below.

TABLE 1

|  | Simulated edge deflection DIS4 | Edge deflection test (FIGS. 21-22) DIS4 |
|---|---|---|
| Longer edge 8b | 7.82 mm | 7.43 mm |
| Shorter edge 8d | 5.15 mm | 5.33 mm |

The inventors concluded that the test illustrated in FIGS. 21-22 validated the computer simulations, and thus confirmed that the VIG unit computer simulations was sufficiently precise and reliable.

Additionally, the test approved that the edges of larger size laminated VIG units having rigid edge seals such as provided by fused edge seal material such as solder glass or a metal solder, when subjected to a larger temperature difference, will tend to provide/describe an edge deflection curve DC (see e.g. FIG. 5) that causes a substantial edge deflection DIS4 in an un-constricted situation where no "outer" mechanical forces constrains the edge deflection. This applies both in laminated VIG units and, according to simulations, VIG units which are not laminated.

It is understood that the vacuum insulated glass unit frame assembly disclosed above in relation to various embodiments of the present disclosure may be used for glazing. For example a building aperture cover such as a window, e.g. a vertical window, a horizontal window or a roof window arranged at an angle between 5° and 85°, or a door. In further embodiments of the present disclosure, the vacuum insulated glass unit frame assembly may be used in or as curtain walls, gates/doors or walls of heating arrangements such as heating ovens such as house hold ovens, and/or it may be used in or as walls or gate/doors cooling appliances such as freezers or refrigerators, such as refrigerators for storing food for human consumption at a temperature below 7° C. such as below 5° C., e.g. below 0° C.

While the present disclosure has been described in detail in connection with only a limited number of embodiments or aspects, it should be readily understood that the present disclosure is not limited to such disclosed embodiments or aspects. Rather, the present disclosure can be modified to incorporate any number of variations, alterations, substitutions or equivalent arrangements not heretofore described, but which are commensurate in scope with the present disclosure. Additionally, while various embodiments or aspects of the present disclosure have been described, it is to be understood that aspects of the present disclosure may include only some of the described embodiments or aspects or combinations of the various embodiments or aspects. Accordingly, the present disclosure is not to be seen as limited by the foregoing description.

FIGURE REFERENCES

1: Vacuum insulated glass unit
1a: Evacuation opening/hole in glass sheet for evacuating gap in VIG
1b: Tube such as glass tube arranged in or at evacuation opening/hole for sealing after the evacuation
1c: Sealing system for sealing between tube and glass sheet
2a, 2b: VIG unit glass sheets enclosing evacuated gap
3: Edge seal
4a, 4b: Major, outer surfaces of VIG unit glass sheets enclosing VIG gap.
4c, 4d: Major surfaces of VIG glass sheets facing the evacuated gap 11
5: Centre portion of VIG edge
6: Holding part
7: Flexible connection arrangement
7a: Wall member of flexible connection arrangement extending along and opposite to VIG unit surface
7b, 7d: Distancing wall of flexible connection arrangement
7c: Wall of flexible connection arrangement
8a-8d: Edge of VIG unit
9, 51: VIG corner
10: VIG unit frame assembly such as a window sash.
11: Evacuated gap in VIG unit defined between major surfaces of VIG glass sheets facing the evacuated gap
12: Support structure in VIG unit gap
14: VIG unit lamination glass sheet
14a: Hole in lamination glass sheet receiving sealing system
15: Outer surface of VIG unit lamination glass sheet
16: Lamination layer.
17: Narrow Edge/surface of lamination glass sheet facing frame
18: Surface of frame
19, 19a, 19b: Flexing space for wall members of flexible connection arrangement
20: Frame holding a VIG unit
20a-20d: elongated frame profile arrangements
21: frame opening enclosed by frame profiles.
22: Base member
23: Glazing member
23a: frame surface facing the frame opening
26: Insulating cavity in frame profile
27: Strengthening/reinforcing members in frame profile
28: Frame profile member
28a, 28b: Holding members
28c: Wall part connecting support legs/walls
28d: Gasket support member
28e: Sash connection part
24, 29: Recess/space between holding members into which VIG edge extends
30: Fixed building aperture cover frame
31a: Bend of flexible connection member towards frame opening
31b: Bend of flexible connection member away from frame opening
35: Glass sheet enclosing gas filled cavity between this glass sheet and the evacuated gap in VIG unit
35a: Outwardly facing surface of glass sheet enclosing gas filled space of hybrid VIG unit
36: Gas-filled space of Hybrid VIG unit
37: Edge seal enclosing gas filled cavity
39: weakening portions in interconnecting wall of holding part
40: Fixation gasket assembly providing resilient suspension elements
40a-40d: Gasket strip of fixation gasket assembly providing resilient suspension element
44: End wall member of fixation gasket 40

45*a*, 45*b*: Fixation members/elements
50*a*, 50*b*: Resilient sealing or gasket for providing a water or airtight seal
60*a*, 60*b*, 61: Gasket flap/lip
63, 65: connection part of elongated gasket arrangement
64, 76: Gasket receiving recess or groove
66: Space between frame profile member and VIG unit glass sheet surface
70: Elongated sash profile
71: Connection area of sash profile
72: Surface of wall member of flexible connection arrangement or of elongated sash profile facing VIG unit surface
74: Elongated separation wall
90: Space at VIG edge into which the VIG edge may slide during thermal bending.
100: Retro-fitting system
101: Existing frame
102, 103: Wall of existing frame
104: recess in existing frame
DC: Edge deflection curve
T1, T2: Temperature of VIG unit glass sheet.
W1: Edge seal width
W2: Width of recess into which the VIG unit extends.
D1, D2: VIG Edge deflection direction
DIS1: Distance in flexing space
DIS3: Distance the frame extend in over the VIG unit glass sheet surface(s)
DIS4: Largest total edge deflection
LD: Longitudinal direction LD of VIG unit edge
F1, F2: Holding/clamping force provided by fixation arrangement
P2: Frame opening plane
P1: VIG unit plane
P3: Plane in frame opening perpendicular to frame opening plane

The invention claimed is:

1. A vacuum insulated glass unit frame assembly, wherein said vacuum insulated glass unit frame assembly comprises:
a frame comprising elongated frame profile arrangements which frames said vacuum insulated glass unit in a frame opening,
wherein said vacuum insulated glass unit comprises at least two glass sheets separated by a gap between said glass sheets, wherein a plurality of support structures are distributed in said gap,
wherein said gap is sealed by means of a sealing system which seals an evacuation hole arranged in a first of said glass sheets and extending to the gap,
wherein a lamination glass sheet is attached to an outer major surface of said first glass sheet by means of a lamination layer, and wherein said sealing system extends into a hole in the lamination glass sheet, and
wherein the edge of the vacuum insulated glass unit proximate the hole in the lamination glass sheet, said sealing system and said hole in the lamination glass sheet into which the sealing system extends are covered by the frame.

2. A vacuum insulated glass unit frame assembly according to claim 1, wherein a fixation system provides fixation of the vacuum insulated glass unit at opposite, outer surfaces of the vacuum insulated glass unit along and opposite to an edge seal of the vacuum insulated glass unit which seals the evacuated gap between the glass sheets of the vacuum insulated glass unit.

3. A vacuum insulated glass unit frame assembly according to claim 2, wherein said frame assembly comprises substantially parallel, elongated top and bottom frame profile arrangements, and substantially parallel, elongated side frame profile arrangements, wherein two, three or all of said top, bottom and side frame profile arrangements at least partly encloses the edges of the vacuum insulated glass unit, where one of said elongated frame profile arrangements covers the sealing system, and wherein all edges of the vacuum insulated glass unit are allowed to provide a thermal edge deflection relative to and/or together with one or more parts of said frame profile arrangements so that the magnitude of the thermal edge deflection varies between corners of the respective edge when the temperature difference between the glass sheets of the vacuum insulated glass unit is 65° C., wherein said fixation system is arranged so as to allow a shift in the direction of the thermal deflection of the corners and/or centre parts of the edges of the vacuum insulated glass unit in response to a change in the temperature difference between the two glass sheets of the vacuum insulated glass unit.

4. A vacuum insulated glass unit frame assembly according to claim 2, wherein said fixation system is configured to restrict the thermal deflection of the vacuum insulated glass unit edges compared to free, un-constricted thermal deflection of the respective edge.

5. A vacuum insulated glass unit frame assembly according to claim 1, wherein said frame comprises a recessed portion which is provided between holding members arranged at opposite outwardly facing surfaces of the vacuum insulated glass unit, and wherein an edge of the vacuum insulated glass unit extends into the recessed portion so that said sealing system and said hole in the lamination glass sheet are covered by the frame.

6. A vacuum insulated glass unit frame assembly according to claim 5, wherein one or more flexible connection arrangements connects a holding part comprising said holding members to elongated frame profile arrangements of the frame, wherein said flexible connection arrangements are configured to flex when said vacuum insulated glass unit exerts a bending moment on the holding part, so that the holding part will move relative to the elongated frame profile arrangements to which the individual holding part is connected, wherein said flexible connection arrangements comprises one or more wall members configured to provide said flexing, wherein a flexing space is provided between an outwardly facing major surface of the vacuum insulated glass unit and said elongated frame profile arrangements to which the individual holding part is connected, and wherein said vacuum insulated glass unit is configured to flex towards and away from said flexing space in response to said bending moment.

7. A vacuum insulated glass unit frame assembly according to claim 6, wherein said flexible connection arrangement is configured to restrict the thermal deflection of the vacuum insulated glass unit edges compared to free, un-constricted thermal deflection of the respective edge.

8. A vacuum insulated glass unit frame assembly according to claim 5, wherein said holding members comprises walls of the frame, wherein a minimum distance is provided between an outer major surface of the vacuum insulated glass unit and said walls of the frame, wherein said minimum distance is at least 4 mm at a temperature difference between the two glass sheets of the vacuum insulated glass unit of substantially 0° C.

9. A vacuum insulated glass unit frame assembly according to claim 1, wherein said vacuum insulated glass unit is fixed between holding members by means a fixation system, wherein said fixation system comprises fixation arrangements arranged between the respective holding member and an outwardly facing surface of the vacuum insulated glass unit.

10. A vacuum insulated glass unit frame assembly according to claim 9, wherein said fixation arrangements comprises one or more resilient suspension elements compressed between a first of said holding members and one of said opposite outwardly facing surfaces, and one or more resilient suspension elements compressed between a second of said holding members and the other of said opposite outwardly facing surfaces, wherein said compressed, resilient suspension elements provides a holding force towards said opposite outwardly facing surfaces of the vacuum insulated glass unit so as to suspend the vacuum insulated glass unit between said first and second holding members, and wherein each of said compressed, resilient suspension elements are configured to be further compressed or expand in response to said thermal deflection of the edge of the VIG unit due to a temperature difference between the two glass sheets.

11. A vacuum insulated glass unit frame assembly according to claim 9, wherein one or both of said fixation arrangements are elongated gasket strips arranged to extend in a direction parallel to an edge of the vacuum insulated glass unit.

12. A vacuum insulated glass unit frame assembly according to claim 9, wherein the hole in the lamination glass sheet receiving the sealing system is positioned between one of said fixation arrangements and an elongated, resilient tightening gasket or sealing.

13. A vacuum insulated glass unit frame assembly according to claim 1, wherein the magnitude of the thermal deflection of the vacuum insulated glass unit edges held by said frame is configured to vary along the respective vacuum insulated glass unit edge between corners where the respective edge terminates, due to a temperature difference between the two glass sheets.

14. A vacuum insulated glass unit frame assembly according to claim 1, wherein the largest total edge deflection of any of the edges of the vacuum insulated glass unit at a temperature difference between the two glass sheets of 65° C. as compared to the vacuum insulated glass unit at a temperature difference of 0° C. is at least 0.3% of the length of the deflecting edge.

15. A vacuum insulated glass unit frame assembly according to claim 14, wherein said largest total edge deflection is in the range of 0.4% to 2% of the length of the deflecting edge.

16. A vacuum insulated glass unit frame assembly according to claim 1, wherein said sealing system is placed below the outer surface of the lamination glass sheet.

17. A vacuum insulated glass unit frame assembly according to claim 16, wherein said sealing system comprises a free evacuation tube top distant to the VIG unit gap.

18. A vacuum insulated glass unit frame assembly according to claim 1, wherein said frame overlaps the edges of the vacuum insulated glass unit with a distance, wherein said distance is at least two times the distance of the width of an edge seal of the vacuum insulated glass unit which seals the evacuated gap between the glass sheets of the vacuum insulated glass unit.

19. A vacuum insulated glass unit frame assembly according to claim 1, wherein said frame overlaps the edges of the vacuum insulated glass unit with a distance, wherein said distance is between 10 mm and 50 mm.

20. A vacuum insulated glass unit frame assembly according to claim 1, wherein said gap is sealed by an edge seal, wherein said edge seal is a fused edge sealing.

* * * * *